United States Patent [19]
Furuta

[11] Patent Number: 5,889,620
[45] Date of Patent: Mar. 30, 1999

[54] FINDER OPTICAL SYSTEM

[75] Inventor: Akiko Furuta, Matsudo, Japan

[73] Assignee: Nikon Corporation, Tokyo, Japan

[21] Appl. No.: 908,628

[22] Filed: Aug. 7, 1997

[30] Foreign Application Priority Data

Aug. 7, 1996 [JP] Japan ................................ 8-226036

[51] Int. Cl.⁶ .......................... G02B 15/14; G03B 13/06; G03B 13/10
[52] U.S. Cl. .......................... 359/689; 359/432; 359/683; 359/686; 396/379; 396/382
[58] Field of Search .................... 359/432, 683, 359/676, 689, 686, 708; 396/379, 382

[56] References Cited

U.S. PATENT DOCUMENTS

| | | | |
|---|---|---|---|
| 4,757,336 | 7/1988 | Nakayama et al. | 396/378 |
| 4,854,680 | 8/1989 | Kikuchi | 359/689 |
| 5,173,806 | 12/1992 | Ogata | 359/686 |
| 5,309,286 | 5/1994 | Abe et al. | 359/695 |
| 5,392,084 | 2/1995 | Kato | 396/378 |
| 5,687,023 | 11/1997 | Ohshita | 359/686 |
| 5,701,199 | 12/1997 | Takato | 359/686 |
| 5,712,727 | 1/1998 | Mouri | 359/686 |

FOREIGN PATENT DOCUMENTS 3-233420 10/1991 Japan .
6-242377 9/1994 Japan .

*Primary Examiner*—Scott J. Sugarman
*Attorney, Agent, or Firm*—Michael N. Meller

[57] ABSTRACT

A finder optical system is provided which is made up of an object lens system and an eyepiece system wherein the object lens system comprises, arranged from the object side:
  a first lens group, which has a negative lens $L_1$,
  a second lens group, which has a positive lens $L_2$, and
  a third lens group, which has a negative lens $L_3$, and has an overall positive refractive power, and wherein
  the eyepiece system is used for observing an image formed via the object lens system,
  the positive lens $L_2$ of the second lens group in the object lens system has a bi-aspherical surface, and
  the magnification of the finder optical system is changed by moving at least the second lens group in the object lens system along the optical axis.

21 Claims, 16 Drawing Sheets

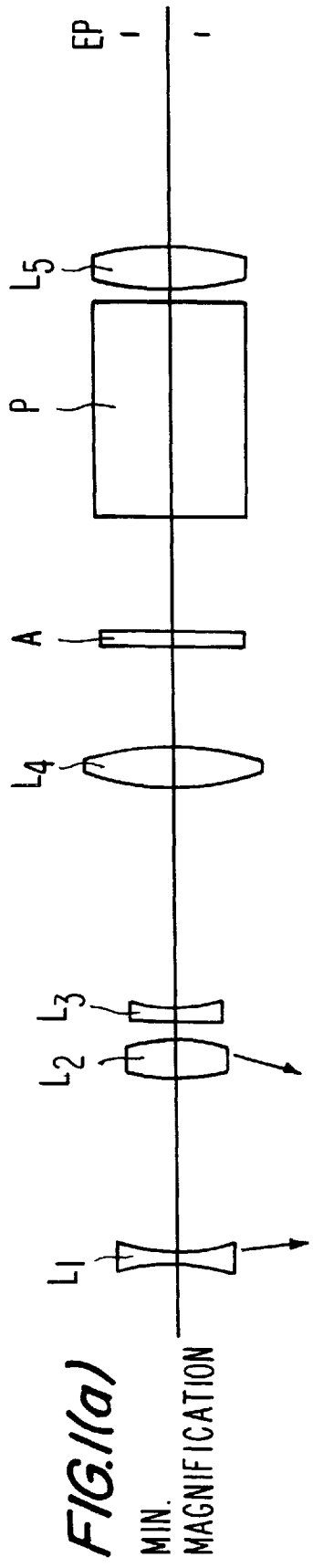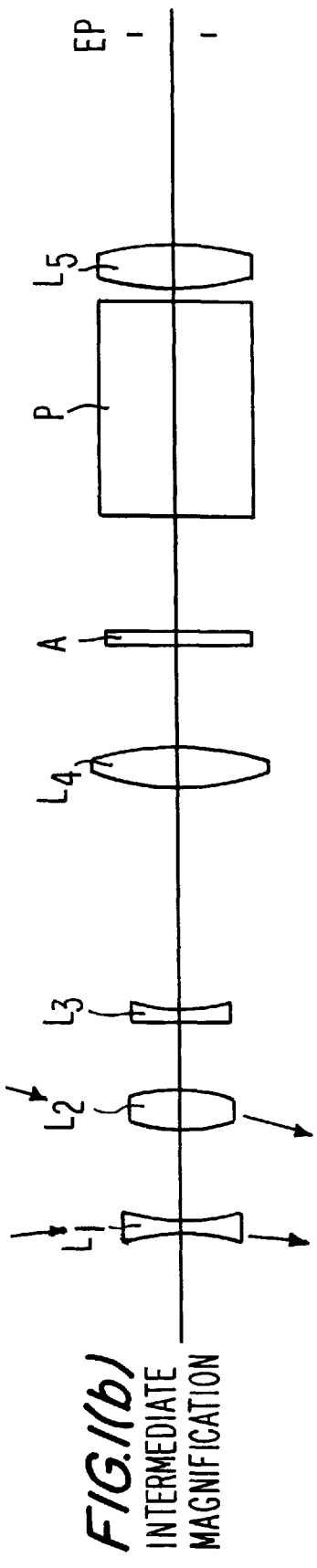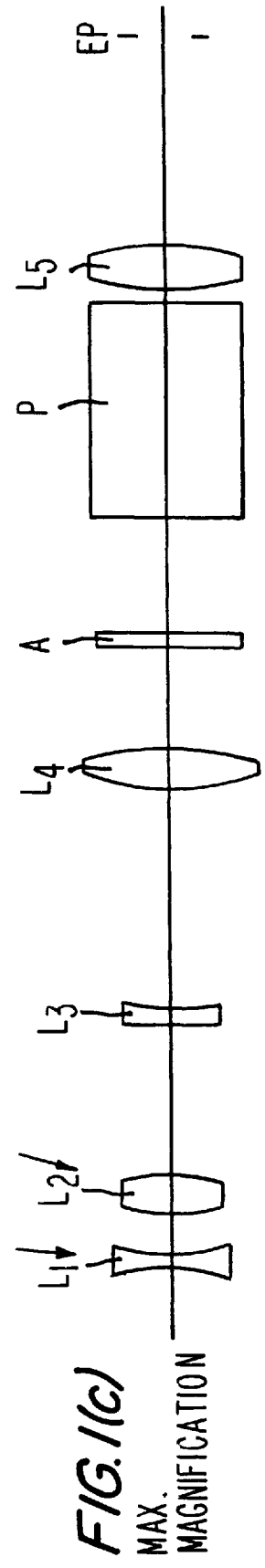
FIG.1(a) MIN. MAGNIFICATION
FIG.1(b) INTERMEDIATE MAGNIFICATION
FIG.1(c) MAX. MAGNIFICATION

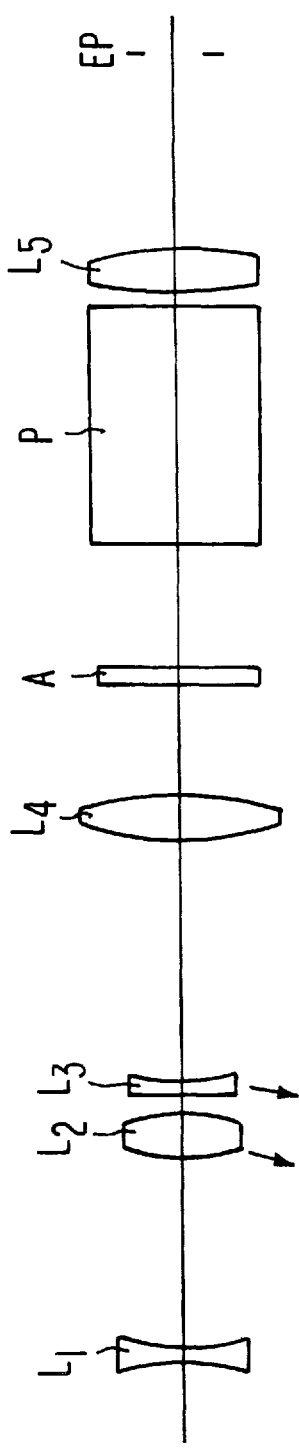
FIG.5(a) MIN. MAGNIFICATION
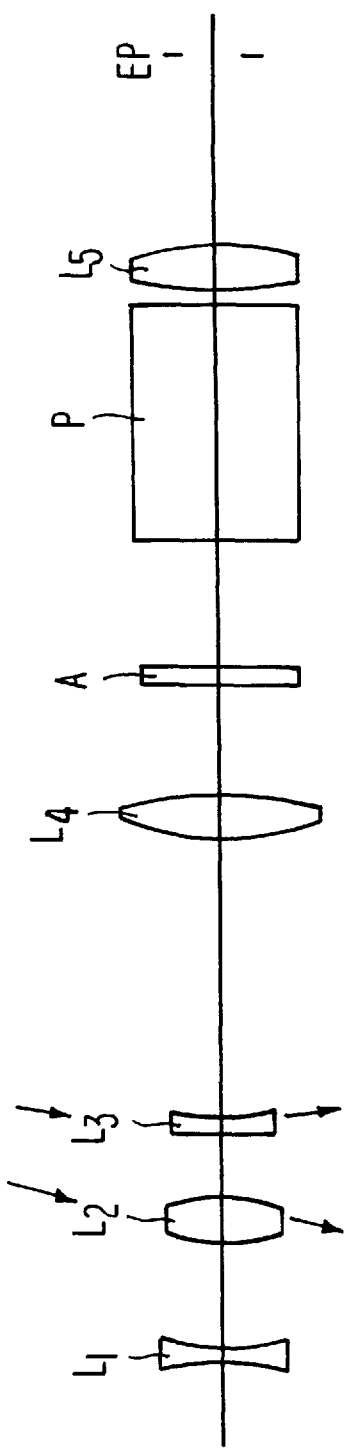
FIG.5(b) INTERMEDIATE MAGNIFICATION
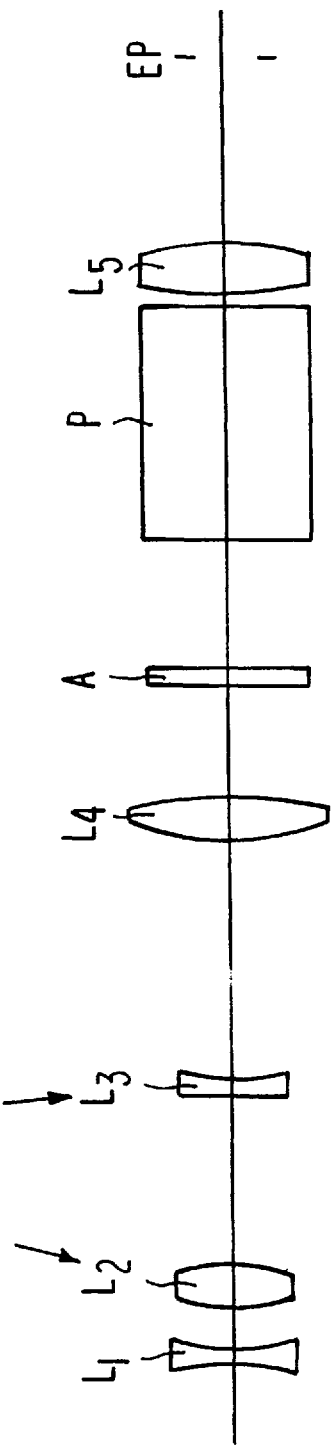
FIG.5(c) MAX. MAGNIFICATION

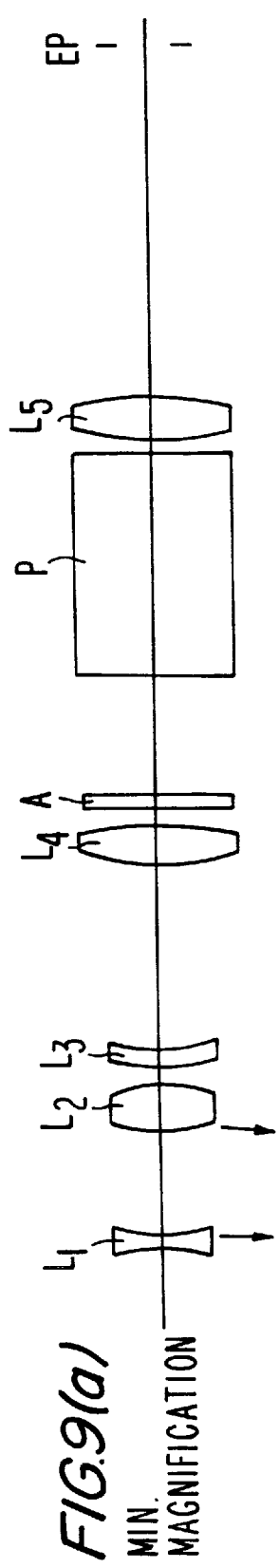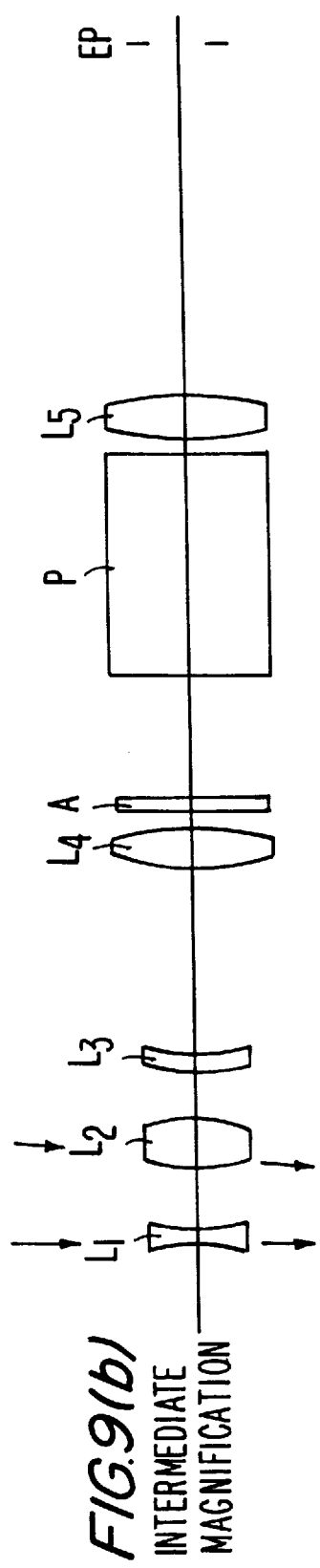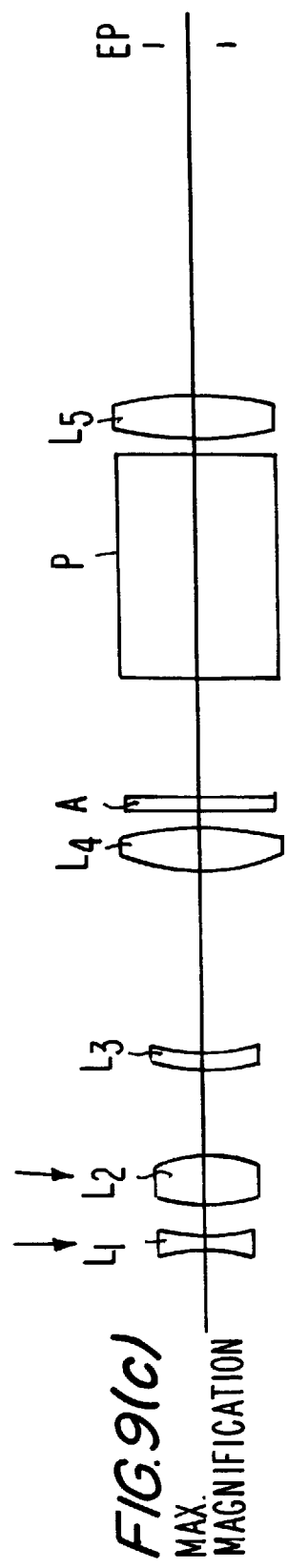
FIG.9(a) MIN. MAGNIFICATION
FIG.9(b) INTERMEDIATE MAGNIFICATION
FIG.9(c) MAX. MAGNIFICATION

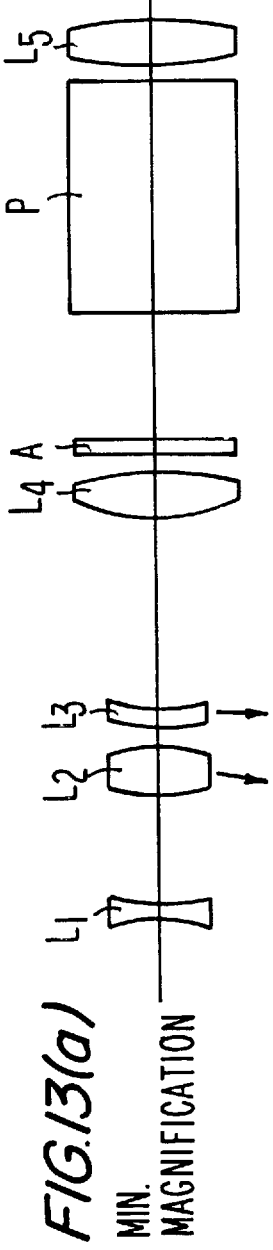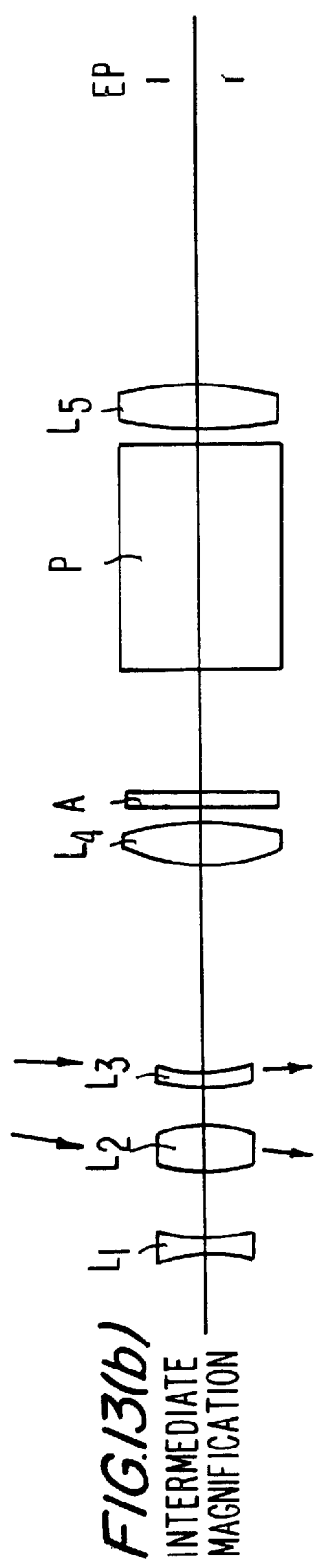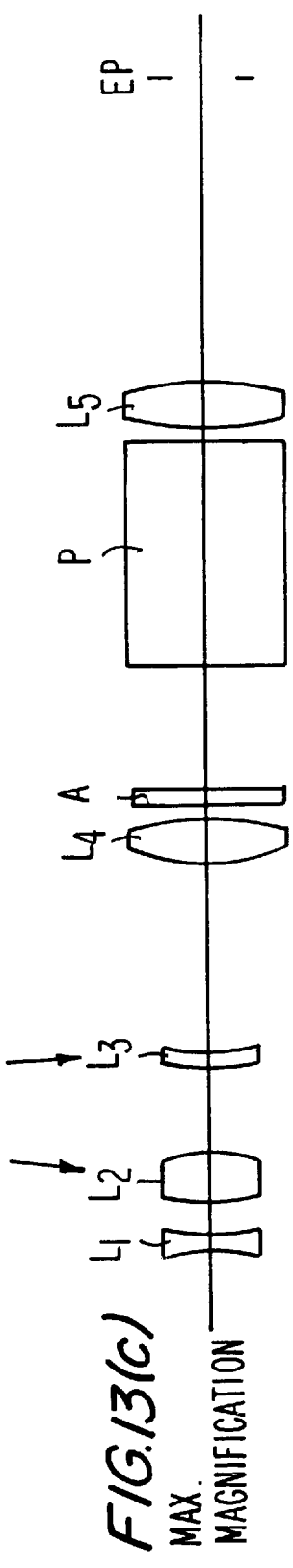
FIG.13(a) MIN. MAGNIFICATION
FIG.13(b) INTERMEDIATE MAGNIFICATION
FIG.13(c) MAX. MAGNIFICATION

FINDER OPTICAL SYSTEM

The present invention relates to a finder optical system. More particularly, the present invention relates to a finder optical system which is used for a still camera, video camera, or a television camera. Still more specifically, it relates to a Keplerian finder.

BACKGROUND OF THE INVENTION

A Keplerian finder is used as a finder for a high-end lens-shutter camera. Being arranged with a field frame or a reticle near the focal point of an object lens, the Keplerian finder, which is constructed with an object lens, which has a positive refractive power and an eyepiece, is capable of providing a clear observation of a field of view, a border of a field of view, and various display indicators. In the Keplerian finder, an entrance pupil exists inside the finder or at the object side of the finder. The Keplerian finder also provides an advantage that, even if it is used as a "zoom finder" for continuous change of magnification or as a wide angle finder, it does not require a large object lens. A zoom finder is particularly popular.

Keplerian optical systems, as disclosed in Japanese Laid-Open patent applications H3-233420 and H6-242377 are well known. In such an optical system, the object lens system is constructed, respectively from the object side, with a first lens group which has a negative refractive power, a second lens group which has a positive refractive power, and a third lens group which has a negative refractive power.

In recent years, attempts have been made to provide a smaller finder with larger magnification for a lens-shutter camera. However, the invention disclosed in Japanese Laid-Open patent application H3-233420 etc. proposes a finder in which each of the object lens groups is constructed with only one lens. This small finder corrects aberration excellently. However, it has a zoom ratio of only about 2×, which is not large enough. A finder which has a zoom ratio of more than 2× is disclosed in Japanese Laid-Open patent application H6-242377. However, each of the lens groups in such a finder is made up of more than one lens. In particular, the second lens group is constructed with a plurality of lenses, which increases manufacturing cost.

SUMMARY OF THE INVENTION

Accordingly, it is an object of the present invention to overcome the problems of the prior art solutions.

It is a further object of the present invention to provide a Keplerian finder which has lens groups constructed with only one lens, provides a zoom ratio of 2× or larger, and demonstrates excellent aberration correction capability.

In a preferred embodiment, the apparatus incorporating the principles of the present invention resolves the problem by providing a finder optical system which is made up of an object lens system and an eyepiece system wherein the object lens system comprises, arranged from the object side:
a first lens group, which has a negative lens $L_1$,
a second lens group, which has a positive lens $L_2$, and
a third lens group, which has a negative lens $L_3$, and has an overall positive refractive power, wherein
the eyepiece system is used for observing an image formed via the object lens system,
the positive lens $L_2$ of the second lens group in the object lens system has a bi-aspherical surface, and
the finder magnification is changed by moving at least the second lens group in the object lens system along the optical axis.

In another preferred embodiment, the apparatus incorporating the principles of the present invention includes a finder wherein the shapes of the bi-aspherical lens surfaces of the positive lens $L_2$ in the second lens group of the object lens system fulfill the following condition:

$$0.1 < |S_2/S_1| < 0.6$$

and the shape of each of the aspherical lens surfaces of the positive lens $L_2$ is expressed by the following mathematical equation:

$$S(y) = \frac{y^2/R}{1 + \sqrt{1 - \kappa \cdot y^2/R^2}} + \sum_{n=2} C_n \times |y^n| - \frac{y^2/r}{1 + \sqrt{1 - y^2/r^2}}$$

$$R = 1/(1/r - 2C_2)$$

where
y is the height perpendicular to the optical axis,
S(y) is the deviation of the aspherical surface at the height, y, in the optical axial direction,
R is the reference radius of curvature,
r is the paraxial radius of curvature,
κ is the conical coefficient, and
$C_n$ is the coefficient of the n-order aspherical surface, and
$S_1$ is the value of the S(y) of the aspherical surface of the positive lens $L_2$ which faces the object when the height $y=|0.25 \times r_3|$,
$S_2$ is the value of the S(y) of the aspherical surface of the positive lens $L_2$ which faces the eye point defined when the height from the optical axis is $y=|0.25 \times r_3|$, and
$r_3$ is the paraxial radius of curvature of the aspherical surface of the positive lens $L_2$ which faces the object.

In still another preferred embodiment, the magnification of the system is zoomed from the low end to the high end by reducing the lens surface separation between the first lens group and the second lens group in the object lens system and by satisfying the following condition:

$$0.9 < (D_{12W} + D_{23W})/(D_{12T} + D_{23T}) < 1.1$$

wherein
$D_{12W}$ is the vertex lens surface separation between the first lens group and the second lens group at the low-magnification end,
$D_{23W}$ is the vertex lens surface separation between the second lens group and the third lens group at the low-magnification end,
$D_{12T}$ is the vertex lens surface separation between the first lens group and the second lens group at the high-magnification end, and
$D_{23T}$ is the vertex separation between the second lens group and the third lens group at the high-magnification end.

In another embodiment, the object lens system has a fourth lens group, which has a positive refractive power, arranged at the eye point side of the third lens group and the system fulfills the following conditions:

$$1 < \beta_{34} < 1.4$$

$$-0.4 < (r_1 + r_2)/(r_1 - r_2) < 0.2$$

where
$\beta_{34}$ is the combined magnification of the third lens group and the fourth lens group at the low-magnification end, $r_1$ is the radius of curvature of the surface of the negative lens $L_1$ which faces the object in the first lens group, and $r_2$ is the paraxial radius of curvature of the surface of the negative lens $L_1$ in the first lens group.

In a further preferred embodiment, the above-noted eyepiece system includes an eyepiece lens $L_5$ which has a positive refractive power and is used for observing a magnified image formed via the object lens system. The object lens system is made up of an object zoom unit which basically changes the focal length by moving the second lens group.

BRIEF DESCRIPTION OF THE DRAWINGS

The above and other objects, features, and advantages of the present invention will become more apparent from the following detailed description taken with the accompanying drawings, in which:

FIG. 1 including FIGS. 1(a) through 1(c), is a lens layout of a first embodiment of the present invention, excluding the reflection surface;

FIG. 5, including FIGS. 5(a) through 5(c), is a lens layout of a second embodiment of the present invention, excluding the reflection surface;

FIG. 9, including FIGS. 9(a) through 9(c), is a lens layout of a third embodiment of the present invention, excluding the reflection surface;

FIGS. 13(a), 13(b), 13(c) is a lens layout of a fourth embodiment of the present invention, excluding the reflection surface;

DESCRIPTION OF THE PREFERRED EMBODIMENTS

Figure 2:
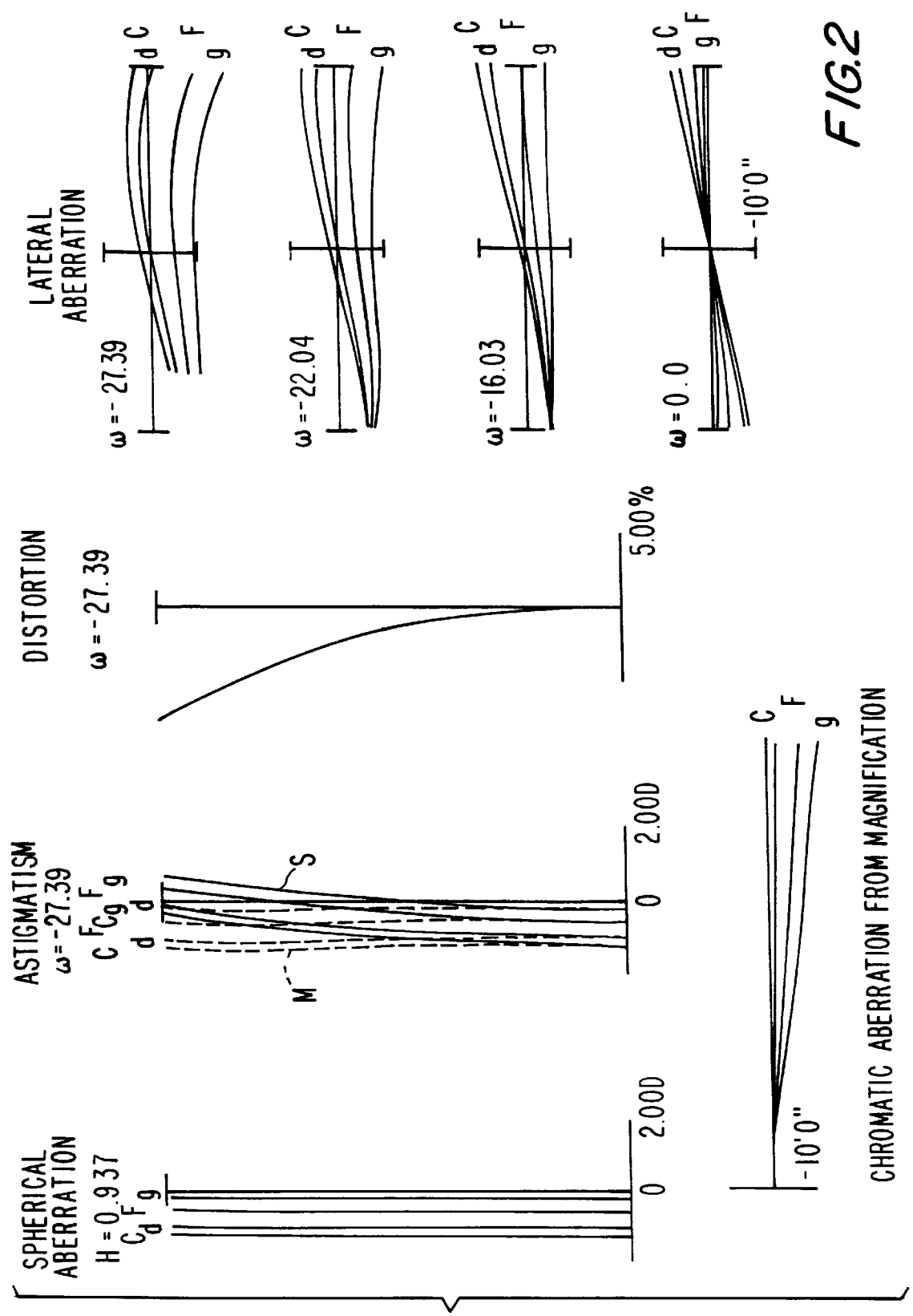
FIG. 2 is an aberration diagram of the first embodiment at minimum magnification.

Preferable modes of the present invention are described herein. FIGS. 1, 5, 9, and 13 are, respectively, lens layouts of the first through fourth embodiments. Each of these figures has three lens positions which respectively shows the lowest magnification, intermediate magnification, and the highest magnification of each of the embodiments of the present invention. Referring to FIG. 1, the finder of the first embodiment, for example, is made up of an object lens system which has a positive refractive power, and comprises:

a first lens group which has a negative lens $L_1$, a second lens group which has a positive lens $L_2$ which has a bi-aspherical surface on both front and back, a third lens group which has a negative lens $L_3$, and a fourth lens group which has a positive lens $L_4$.

A mirror (not illustrated) is arranged as the first reflection means in the space between the negative lens $L_3$ in the third lens group and the positive lens $L_4$ in the fourth lens group. Also, near the image surface formed via the object lens system, an acrylic plate A is arranged for display indications etc. in the field frame.

The second, third, and fourth reflection means are arranged at the eye point side (EP) of the acrylic plate A. The second reflection means is made up of a mirror (not illustrated). The third and fourth reflection means are made up of a prism P. An eyepiece $L_5$ which has an aspherical surface which faces the object and has a positive refractive power, is arranged at the eye point side of the prism P.

For all of the embodiments, the lens layout of the first and second embodiments (FIGS. 1 and 5) are identical. The lens layout of the third and forth embodiments (FIGS. 9 and 13) are also identical. Note that in the first and third embodiments (FIGS. 1 and 9), zooming is performed by moving the negative lens $L_1$ in the first lens group and the positive lens $L_2$ in the second lens group. In the second and fourth embodiments (FIGS. 5 and 13), zooming is performed by moving the positive lens $L_2$ in the second lens group and the negative lens $L_3$ in the third lens group.

To understand the advantages and operation of the embodiments illustrated in FIGS. 1, 5, 9, and 13, the following considerations should be noted.

It is known that, in order to obtain an excellent aberration correction, a finder optical system with a zoom ratio of larger than 2× is made up of a second lens group, which is the primary magnification group, and constructed with a plurality of lenses. However, such a configuration is not desirable because the use of a plurality of lenses complicates the structure and increases the size of the system. It is more preferable to use a second lens group which has a zoom ratio of less than 2×, but which can be constructed with a single lens by providing an aspherical surface to one of the surfaces of the second lens group.

Knowing the above, in developing the apparatus incorporating the principles of the present invention, the inventor attempted the configuration of a second lens group with a single lens with an aspherical surface on one side for a Keplerian finder which has a zoom ratio of equal to or larger than 2× and has a negative-positive-negative construction. The results were as follows: an "outside coma" (soto coma) was obtained in the finder in which an aspherical surface was formed only on the lens surface which faces the object. An "inside coma" (uchi coma) was obtained in the finder in which an aspherical surface was formed only on the lens surface which faces the eye point. None of the results demonstrated excellent aberration correction.

The inventor then constructed the second lens group, the primary magnification group, with a bi-aspherical single lens and repeated the tests. As a result, in accordance with the principles of the present invention, it was found that the coma aberration generated by the lens surface which faces the object, and that generated by the lens surface which faces the eye point, cancel each other. The spherical and coma aberrations can be corrected excellently should both lens surfaces which face the object and the eye point be formed aspherically such that each radius of curvature decreases as the distance from the optical axis increases and should an appropriate aspherical area be allocated for both surfaces. It was found critical that the second lens group be made up of a single lens. In order to obtain a large magnification, both the front and back surfaces of the positive lens $L_2$ in the second lens group had to be aspherical.

In accordance with the principles of the present invention, it is preferred that the shapes of the bi-aspherical lens surfaces in the second lens group of the object lens system fulfill the following condition (1):

$$0.1 < |S_2/S_1| < 0.6 \qquad (1)$$

where $S_1$ is the value of the S(y) of the aspherical surface of the positive lens $L_2$ which faces the object defined by the following mathematical equation (a) when the height from the optical axis is $y = |0.25 \times r_3|$, $S_2$ is the value of the S(y) of the aspherical surface of the positive lens $L_2$ which faces the eye point defined by the following mathematical equation (a) when the height from the optical axis is $y = |0.25 \times r_3|$, and $r_3$ is the paraxial radius of curvature of the aspherical lens surface of the positive lens $L_2$ which faces the object.

Also, the aspherical surface area S(y) at the height y is expressed by the following mathematical equation (a):

$$S(y) = \frac{y^2/R}{1 + \sqrt{1 - \kappa \cdot y^2/R^2}} + \sum_{n=2} C_n \times |y^n| - \frac{y^2/r}{1 + \sqrt{1 - y^2/r^2}} \qquad (a)$$

where y is the height perpendicular to the optical axis,

R is the reference radius of curvature,

κ is the conical coefficient, and $C_n$ is the coefficient of the n-order aspherical surface.

The paraxial radius of curvature r is defined by the following equation (b):

$$r = 1/(2C_2 + 1/R) \qquad (b)$$

That is, the asphericality of the positive lens $L_2$ produces coma aberration correction accuracy to a great extent. To obtain an excellent coma aberration correction, it is preferable that the aspherical surface of the positive lens $L_2$ satisfies the above condition (1). If it exceeds the upper limit of the condition (1), the aspherical area of the lens surface which faces the eye point is too large. This creates the "inside coma" to generate flare. On the other hand, if the aspherical surface of the lens $L_2$ exceeds the lower limit of condition (1), the aspherical area of the lens surface, which faces the object, increases. As a result, it creates the "outside coma" situation. This impedes excellent aberration correction.

In an object lens system constructed with at least three groups in which the second lens group is allocated as the primary magnification group as described above, the following two types of zooming technique may be used for changing the focal length. In the first technique, during zooming, the third lens group in the object lens system is fixed and the first and the second lens groups are moved along the optical axis. In the second technique, during zooming, the first lens group in the object lens system is fixed and the second and the third lens groups are moved along the optical axis.

In the first technique, in which the first and second lens groups are moved, the displacement of the lens group from the pupil and the aspherical aberration will be suppressed. In the second technique in which the second and third lens groups are moved, the same effect can be obtained as with the first technique. At the same time, the object point of the second lens group can be fixed because the first lens group can be fixed.

In accordance with the principles of the present invention, zooming from the low-magnification end to the high-magnification end is performed by reducing the separation or spacing between the first lens group and the second lens in the object lens system and satisfying the following condition (2):

$$0.9 < (D_{12W} + D_{23W})/(D_{12T} + D_{23T}) < 1.1 \qquad (2)$$

wherein $D_{12W}$ is the vertex separation between surfaces of the first lens group and the second lens group at the low-magnification or wide-angle end, $D_{23W}$ is the vertex separation between surfaces of the second lens group and the third lens group at the low-magnification or wide-angle end, $D_{12T}$ is the vertex separation between surfaces of the first lens group and the second lens group at the high-magnification or telephoto end, and $D_{23T}$ is the vertex separation between surfaces of the second lens group and the third lens group at the high-magnification or telephoto end.

In other words, in either technique in which the first and second lens groups are moved or the third and the fourth lens groups are moved, it is important that the separation between the lens surfaces are minimized to reduce the size of the object lens system. The size of the object lens system can be reduced by fulfilling the above condition (2). If the magnification exceeds the upper limit, the primary beam deviates from the optical axis of the first lens group at the low-magnification end. The diameter of the first lens group must be increased to capture the primary beam. This increases the size of the object lens. On the other hand, if the magnification exceeds the lower limit of condition (2), the object lens system becomes larger at the high-magnification end than the overall length of the object lens at the low-magnification end. This creates unnecessary separation between the lens surfaces at the low-magnification end, thus increasing the size of the system.

In the apparatus incorporating the principles of the present invention, the object lens system may include a fourth lens group, which has a positive refractive power, arranged at the eye point side of the third lens group. In such case, it is preferable that the object lens system fulfill the following two conditions (3) and (4):

$$1 < \beta_{34} < 1.4 \qquad (3)$$

$$-0.4 < (r_1 + r_2)/(r_1 - r_2) < 0.2 \qquad (4)$$

where $\beta_{34}$ is the combined magnification of the third lens group and the fourth lens group at the low-magnification end, $r_1$ is the radius of curvature of the surface of the negative lens $L_1$ in the first lens group which faces the object, and $r_2$ is the paraxial radius of curvature of the surface of the negative lens $L_1$ in the first lens group.

In other words, if the fourth lens group is arranged at the eye point side of the third lens group, the combination of the third lens group and the fourth lens group provides a so-called "rear converter" function which changes the focal length of the zoom object unit. The zoom object unit is made up of the first lens group and the second lens group. The "rear converter" function provides a higher level aberration correction which corrects the aberration which the zoom object unit is unable to correct, and the "field lens" function which guides the incoming light beam from the finder to the eye point.

In order to reduce the overall size of the object lens system including the fourth lens group, it is preferable that the combined magnification of the third lens group and the fourth lens group be equal to or larger than 1×. However, there is a limit to increasing this magnification. The larger the magnification, the smaller are the focal lengths for the first lens group and the second lens group. Nevertheless, the fact that an exit pupil requires a certain diameter increases the combined magnification ratio of the first lens group and the second lens group. This makes it particularly difficult to correct the spherical aberration among all the aberrations. Therefore, it is preferable that the magnification satisfies the above condition (3). To correct the spherical aberration, it is preferable that the magnification satisfies condition (4).

If the magnification exceeds the lower limit of condition (3), the effect of the third lens group is reduced, thus its function as the "rear converter" will not be provided. On the other hand, if the magnification exceeds the upper limit of condition (3), various aberrations generated in the first and second lens groups will increase, thus making it difficult to correct them. It will be difficult for each of the lens groups which has a simple lens configuration to correct them, thus increasing the size of the object lens system.

Condition (4) relates not only to spherical aberration but also to distortion. If the magnification exceeds the upper limit of condition (4), the radius of curvature of the lens surface of the negative lens $L_1$ which faces the object in the first lens group increases. It also obtains a large deflection angle (deviation) with respect to the "land" light beam, which makes it difficult to correct spherical aberration. On the other hand, if the magnification exceeds the lower limit of condition (4), the small radius of curvature of the lens surface, which faces the object, increases the deflection angle (deviation) with respect to the light beam outside the optical axis, which makes it difficult to correct distortion.

In order to configure a finder optical system using the configuration of the apparatus incorporating the principles of the present invention, the finder must provide an erect image as a matter of course. In order to provide an erect image, there are two techniques, one in which a relay lens is used and the other in which a reflection means is used. In the technique in which a relay lens is used, obtaining reduction of overall size of a finder and good aberration correction at the same time is difficult. This technique normally requires a larger number of lenses for the optical system. Therefore, it is preferable to use the reflection means to fulfill the purpose of the present invention, which is to reduce the size of the finder.

In other words, it is preferable in the apparatus incorporating the principles of the present invention that the object lens system includes a fourth lens group, which has a positive refractive power, and faces the eye point in the first lens group; a reflection means in the space between the third lens group and the fourth lens group; wherein the eyepiece system includes a reflection means which reflects light from the object lens system and at least one eyepiece $L_5$ which has an aspherical surface facing the object lens.

First, regarding the reflection means, which is arranged within the object lens system, it is preferable that both lens groups are separated by a wide distance such that the third lens group and the fourth lens group can have the above-mentioned effects. Therefore, the reflection means can be readily arranged between the two lens groups. Also, by reflecting light beams at the object lens system, the overall length of the object lens system can be reduced.

Then, in the eyepiece system, three reflection surfaces are arranged at the point which is closer to the eye point than the image formed via the object lens system. The fact that there are only three reflection surfaces between the image formed via the object lens system and the eyepiece $L_5$ implies that the optical path from the image to the eyepiece $L_5$ is short. This increases the refractive power of the eyepiece system $L_5$, thus increasing the enlargement ratio. In this way, a compact finder is constructed which provides bright and "high power" magnification for a reasonable cost. In addition, to obtain a symmetrical coma aberration in the eyepiece system, it is desirable that the eyepiece $L_5$ has one aspherical surface.

Accordingly, the advantages of the illustrated embodiments should be clear.

Various values for the first through fourth embodiments are shown in the following Tables 1 through 4. In the various values section in each of the tables, "m" denotes a magnification, "X" denotes a degree of view ("shido"), "2ω" denotes a field angle, EP denotes the "eye relief" (the length between the final lens surface and the eye point), and "2H'" denotes the diameter of a pupil.

Also, in the lens values section, the first column shows the surface number of each of the lenses, "r" in the second column shows the radius of curvature of each of the lens surfaces, "d" in the third column shows the separation or spacing between each of the lens surfaces, "θ" in the fourth column shows the abbe number, "n" in the fifth column shows an index of refraction for the d-line of each of the lenses, and the sixth column shows the lens number for each of the lenses. Note that an asterisk (*) in the first column shows an aspherical surface and "r" which denotes the aspherical lens surface represents the vertex radius of curvature.

The aspherical surface is asymmetrical around the X-axis when the axis, which is perpendicular to the optical axis, is set to y and is expressed by the following mathematical equation:

$$X(y) = \frac{y^2/R}{1 + \sqrt{1 - \kappa \cdot y^2/R^2}} + \Sigma C_n \times |y^n| \quad (c)$$

In the aspherical surface data section, all coefficients of the aspherical surface $C_n$ which are not indicated are zeros.

In addition, various values related to each of the conditions (1) through (4) described above are shown in Table 5.

TABLE 1

| Overall Values | | | |
|---|---|---|---|
| m = 0.467 to 1.168 | X = −1.00D | | |
| 2ω = 54.8° to 20.3° | EP = 15.0 | 2H' = 4.0 | |
| | Various Lens Values | | |

| Number | r | d | ν | n | |
|---|---|---|---|---|---|
| 1 | −15.1834 | 1.0000 | 30.24 | 1.585180 | $L_1$ |
| 2* | 14.6781 | (D$_1$) | | | |
| 3* | 9.3180 | 3.0000 | 57.57 | 1.491080 | $L_2$ |
| 4* | −9.6218 | (D$_2$) | | | |
| 5 | 440.1634 | 1.0000 | 30.24 | 1.585180 | $L_3$ |

TABLE 1-continued

| | | | | | | |
|---|---|---|---|---|---|---|
| 6 | 13.3755 | 15.8000 | | | | |
| 7* | 13.7046 | 3.0000 | | 57.57 | 1.491080 | $L_4$ |
| 8 | −21.7772 | 7.2869 | | | | |
| 9 | ∞ | 1.0000 | | 58.80 | 1.522160 | A |
| 10 | ∞ | 8.3900 | | | | |
| 11 | ∞ | 15.2400 | | 33.59 | 1.571100 | P |
| 12 | ∞ | 1.0000 | | | | |
| 13* | 20.3196 | 3.0000 | | 57.57 | 1.491080 | $L_5$ |
| 14 | −20.3618 | 15.0000 | | | | |
| 15 | Eye Point | | | | | |

Aspherical Surface Data

| | | |
|---|---|---|
| Number = 2 | $C_2 = 0.0$ | $C_4 = 3.06020 \times 10^{-5}$ |
| $\kappa = -7.4242$ | $C_6 = 8.03300 \times 10^{-6}$ | $C_8 = -6.19180 \times 10^{-7}$ |
| | $C_{10} = 1.74690 \times 10^{-8}$ | |
| Number = 3 | $C_2 = 0.0$ | $C_4 = 4.63660 \times 10^{-5}$ |
| $\kappa = -2.3034$ | $C_6 = -2.28930 \times 10^{-6}$ | $C_8 = -5.31630 \times 10^{-7}$ |
| | $C_{10} = -3.61470 \times 10^{-9}$ | $C_{12} = -0.28136 \times 10^{-9}$ |
| | $C_{14} = 0.84243 \times 10^{-10}$ | $C_{16} = -0.70649 \times 10^{-12}$ |
| Number = 4 | $C_2 = 0.0$ | $C_4 = 1.12240 \times 10^{-4}$ |
| $\kappa = 0.2380$ | $C_6 = -6.30430 \times 10^{-6}$ | $C_8 = -1.63030 \times 10^{-7}$ |
| | $C_{10} = -4.62130 \times 10^{-9}$ | |
| Number = 7 | $C_2 = 0.0$ | |
| $\kappa = -2.5000$ | | |
| Number = 13 | $C_2 = 0.0$ | |
| $\kappa = -3.3287$ | | |

Various Separation

| Magnification | 0.467 | 0.739 | 1.168 |
|---|---|---|---|
| $D_1$ | 12.30517 | 6.39377 | 2.65490 |
| $D_2$ | 1.07581 | 4.81279 | 10.72175 |

TABLE 2

Overall Values m = 0.467 to 1.137   X = −1.00 D
2ω = 54.8° to 20.3°   EP = 15.0   2H' = 4.0

Various Lens Values

| Number | r | d | ν | n | |
|---|---|---|---|---|---|
| 1 | −15.1834 | 1.0000 | 30.24 | 1.585180 | $L_1$ |
| 2* | 14.6781 | $(D_1)$ | | | |
| 3* | 9.3180 | 3.0000 | 57.57 | 1.491080 | $L_2$ |
| 4* | −9.6218 | $(D_2)$ | | | |
| 5 | 440.1634 | 1.0000 | 30.24 | 1.585180 | $L_3$ |
| 6 | 13.3755 | $(D_3)$ | | | |
| 7* | 13.7046 | 3.0000 | 57.57 | 1.491080 | $L_4$ |
| 8 | −21.7772 | 7.2870 | | | |
| 9 | ∞ | 1.0000 | 58.80 | 1.522160 | A |
| 10 | ∞ | 8.3900 | | | |
| 11 | ∞ | 15.2400 | 33.59 | 1.571100 | P |
| 12 | ∞ | 1.0000 | | | |
| 13* | 20.3196 | 3.0000 | 57.57 | 1.491080 | $L_5$ |
| 14 | −20.3618 | 15.0000 | | | |
| 15 | Eye Point | | | | |

Aspherical Surface Data

| | | |
|---|---|---|
| Number = 2 | $\kappa = -7.4242$ | $C_2 = 0.0$ |
| | | $C_4 = 3.06020 \times 10^{-5}$ |
| | | $C_6 = 8.03300 \times 10^{-6}$ |
| | | $C_8 = -6.19180 \times 10^{-7}$ |
| | | $C_{10} = 1.74690 \times 10^{-8}$ |
| Number = 3 | $\kappa = -2.3034$ | $C_2 = 0.0$ |
| | | $C_4 = 4.63660 \times 10^{-5}$ |
| | | $C_6 = -2.28930 \times 10^{-6}$ |
| | | $C_8 = -5.31630 \times 10^{-7}$ |
| | | $C_{10} = -3.61470 \times 10^{-9}$ |
| | | $C_{12} = -0.28136 \times 10^{-9}$ |
| | | $C_{14} = 0.84243 \times 10^{-10}$ |
| | | $C_{16} = -0.70649 \times 10^{-12}$ |
| Number = 4 | $\kappa = 0.2380$ | $C_2 = 0.0$ |
| | | $C_4 = 1.12240 \times 10^{-4}$ |
| | | $C_6 = -6.30430 \times 10^{-6}$ |
| | | $C_8 = -1.63030 \times 10^{-7}$ |
| | | $C_{10} = -4.62130 \times 10^{-9}$ |
| Number = 7 | $\kappa = -2.5000$ | $C_2 = 0.0$ |
| Number = 13 | $\kappa = -3.3287$ | $C_2 = 0.0$ |

Various Separation

| Magnification | 0.467 | 0.739 | 1.137 |
|---|---|---|---|
| $D_1$ | 12.30517 | 6.85569 | 2.65564 |
| $D_2$ | 1.07581 | 3.94552 | 10.71876 |
| $D_3$ | 15.79999 | 18.37975 | 15.80657 |

TABLE 3

Overall Values m = 0.464 to 0.815   X = −1.00 D
2ω = 54.7° to 29.0°   EP = 15.0   2 H' = 4.0

Various Lens Values

| Number | r | d | ν | n | |
|---|---|---|---|---|---|
| 1 | −10.2693 | 1.0000 | 30.24 | 1.585180 | $L_1$ |
| 2* | 17.7496 | $(D_1)$ | | | |
| 3* | 7.9334 | 3.4650 | 57.57 | 1.491080 | $L_2$ |
| 4* | −7.2651 | $(D_2)$ | | | |
| 5 | 17.6678 | 1.0000 | 30.24 | 1.585180 | $L_3$ |
| 6 | 9.2991 | 12.6785 | | | |
| 7* | 10.4096 | 3.0000 | 57.57 | 1.491080 | $L_4$ |
| 8 | −21.4859 | 1.1359 | | | |
| 9 | ∞ | 1.0000 | 58.80 | 1.522160 | A |
| 10 | ∞ | 8.3900 | | | |
| 11 | ∞ | 15.2400 | 33.59 | 1.571100 | P |
| 12 | ∞ | 1.0000 | | | |
| 13* | 20.3196 | 3.0000 | 57.57 | 1.491080 | $L_5$ |
| 14 | −20.3618 | 15.0000 | | | |
| 15 | Eye Point | | | | |

Aspherical Surface Data

| | | |
|---|---|---|
| Number = 2 | $\kappa = -12.3843$ | $C_2 = 0.0$ |
| | | $C_4 = 2.77320 \times 10^{-5}$ |
| | | $C_6 = 1.78890 \times 10^{-5}$ |
| | | $C_8 = -2.99910 \times 10^{-6}$ |
| | | $C_{10} = 1.87590 \times 10^{-7}$ |
| Number = 3 | $\kappa = -5.8798$ | $C_2 = 0.0$ |
| | | $C_4 = 2.35140 \times 10^{-4}$ |
| | | $C_6 = 1.86890 \times 10^{-4}$ |
| | | $C_8 = -5.64460 \times 10^{-5}$ |
| | | $C_{10} = 7.20110 \times 10^{-6}$ |
| | | $C_{12} = -0.40422 \times 10^{-6}$ |
| | | $C_{14} = -0.19716 \times 10^{-8}$ |
| | | $C_{16} = 0.82776 \times 10^{-9}$ |
| Number = 4 | $\kappa = 3.8100$ | $C_2 = 0.0$ |
| | | $C_4 = 9.82700 \times 10^{-4}$ |
| | | $C_6 = 1.54570 \times 10^{-4}$ |
| | | $C_8 = -1.62210 \times 10^{-5}$ |
| | | $C_{10} = 1.10500 \times 10^{-6}$ |
| Number = 7 | $\kappa = -2.5000$ | $C_2 = 0.0$ |
| Number = 13 | $\kappa = -3.3287$ | $C_2 = 0.0$ |

Various Separation

| Magnification | 0.464 | 0.624 | 0.815 |
|---|---|---|---|
| $D_1$ | 6.87908 | 4.00615 | 2.05170 |
| $D_2$ | 1.13450 | 3.27814 | 5.83971 |

TABLE 4

Overall Values m = 0.464 to 0.815  X = −1.00 D
2ω = 54.7° to 29.0°  EP = 15.0  2 H' = 4.0

Various Lens Values

| Number | r | d | ν | n | |
|---|---|---|---|---|---|
| 1 | −10.2693 | 1.0000 | 30.24 | 1.585180 | $L_1$ |
| 2* | 17.7496 | ($D_1$) | | | |
| 3* | 7.9334 | 3.4650 | 57.57 | 1.491080 | $L_2$ |
| 4* | −7.2651 | ($D_2$) | | | |
| 5 | 17.6678 | 1.0000 | 30.24 | 1.585180 | $L_3$ |
| 6 | 9.2991 | ($D_3$) | | | |
| 7* | 10.4096 | 3.0000 | 57.57 | 1.491080 | $L_4$ |
| 8 | −21.4860 | 1.1359 | | | |
| 9 | ∞ | 1.0000 | 58.80 | 1.522160 | A |
| 10 | ∞ | 8.3900 | | | |
| 11 | ∞ | 15.2400 | 33.59 | 1.571100 | P |
| 12 | ∞ | 1.0000 | | | |
| 13* | 20.3196 | 3.0000 | 57.57 | 1.491080 | $L_5$ |
| 14 | −20.3618 | 15.0000 | | | |
| 15 | Eye Point | | | | |

Aspherical Surface Data

Number = 2  κ = −12.3843  $C_2 = 0.0$
$C_4 = 2.77320 \times 10^{-5}$
$C_6 = 1.78890 \times 10^{-5}$
$C_8 = -2.99910 \times 10^{-6}$
$C_{10} = 1.87590 \times 10^{-7}$ Number = 3  κ = −5.8798  $C_2 = 0.0$
$C_4 = 2.35140 \times 10^{-4}$
$C_6 = 1.86890 \times 10^{-4}$
$C_8 = -5.64460 \times 10^{-5}$
$C_{10} = 7.20110 \times 10^{-6}$
$C_{12} = -0.40422 \times 10^{-6}$
$C_{14} = -0.19716 \times 10^{-8}$
$C_{16} = 0.82776 \times 10^{-9}$ Number = 4  κ = 3.8100  $C_2 = 0.0$
$C_4 = 9.82700 \times 10^{-4}$
$C_6 = 1.54570 \times 10^{-4}$
$C_8 = -1.62210 \times 10^{-5}$
$C_{10} = 1.10500 \times 10^{-6}$ Number = 7  κ = −2.5000  $C_2 = 0.0$
Number = 13  κ = −3.3287  $C_2 = 0.0$

Various Separation

| | | | |
|---|---|---|---|
| Magnification | 0.464 | 0.624 | 0.815 |
| $D_1$ | 6.87908 | 4.22846 | 2.08685 |
| $D_2$ | 1.13449 | 2.43070 | 5.64693 |
| $D_3$ | 12.67853 | 14.03294 | 12.95832 |

TABLE 5

| Embodiment Number | | 1 | 2 | 3 | 4 |
|---|---|---|---|---|---|
| (1) | $S_2/S_1$ | −0.387 | −0.387 | −0.269 | −0.269 |
| | $S_1$ | −0.014 | −0.014 | −0.017 | −0.017 |
| | $S_2$ | 0.0054 | 0.0054 | 0.0045 | 0.0045 |
| | Y | 2.330 | 2.330 | 1.983 | 1.983 |
| | $r_3$ | 9.318 | 9.318 | 7.933 | 7.933 |
| (2) | $(D_{12w} + D_{23w})/(D_{12T} + D_{23T})$ | 1.000 | 1.000 | 1.015 | 1.036 |
| | $D_{12w}$ | 12.305 | 12.305 | 6.879 | 6.879 |
| | $D_{23w}$ | 1.076 | 1.076 | 1.135 | 1.134 |
| | $D_{12T}$ | 2.655 | 2.656 | 2.052 | 2.087 |
| | $D_{23T}$ | 10.722 | 10.719 | 5.840 | 5.647 |
| (3) | $β_{34}$ | 1.238 | 1.234 | 1.198 | 1.198 |
| (4) | $(r_1 + r_2)/(r_1 - r_2)$ | 0.017 | 0.017 | −0.267 | −0.267 |
| | $r_1$ | −15.183 | −15.183 | −10.269 | −10.269 |
| | $r_2$ | 14.678 | 14.678 | 17.750 | 17.750 |

Figure 3:
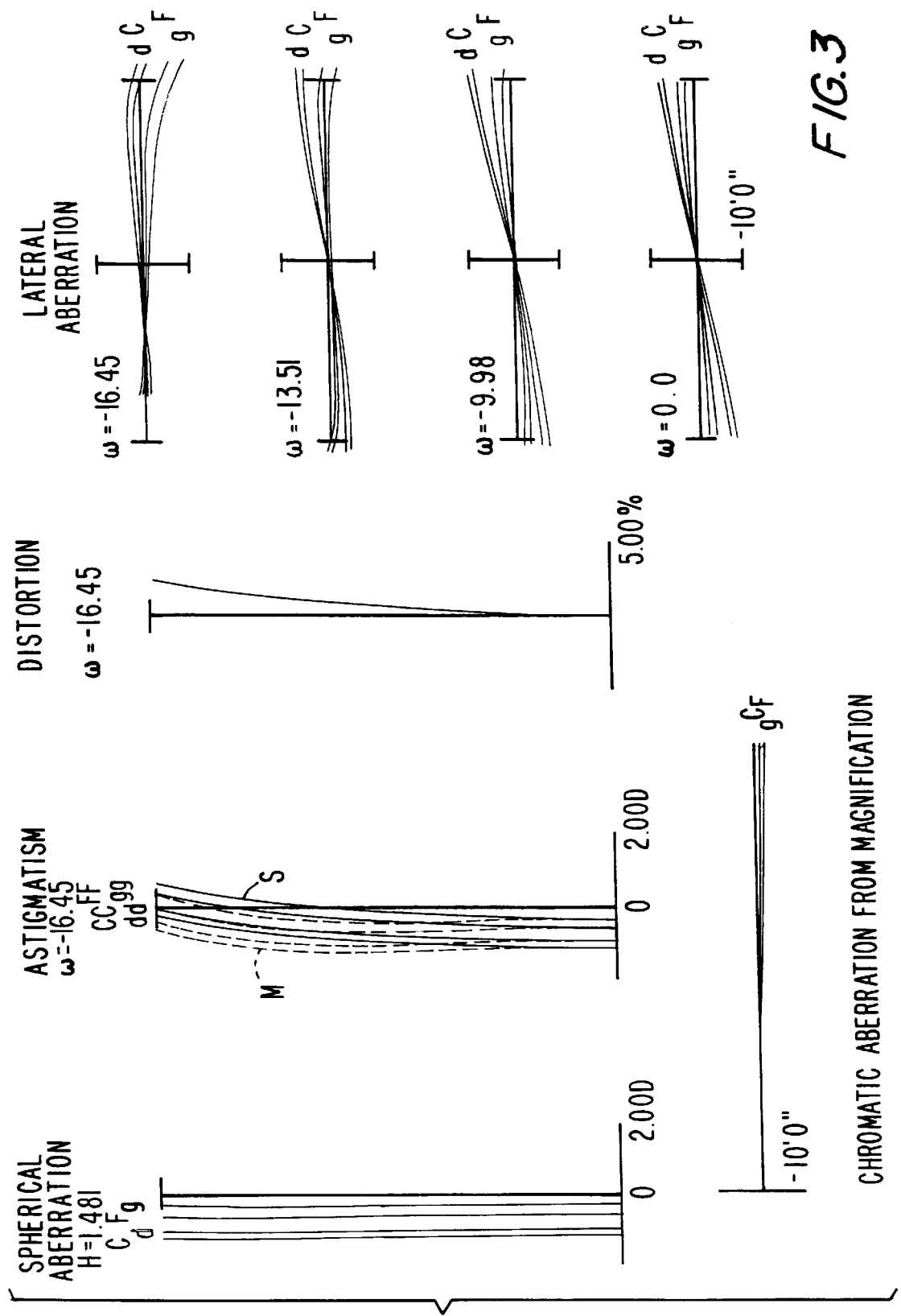
FIG. 3 is an aberration diagram of the first embodiment at intermediate magnification.
Figure 4:
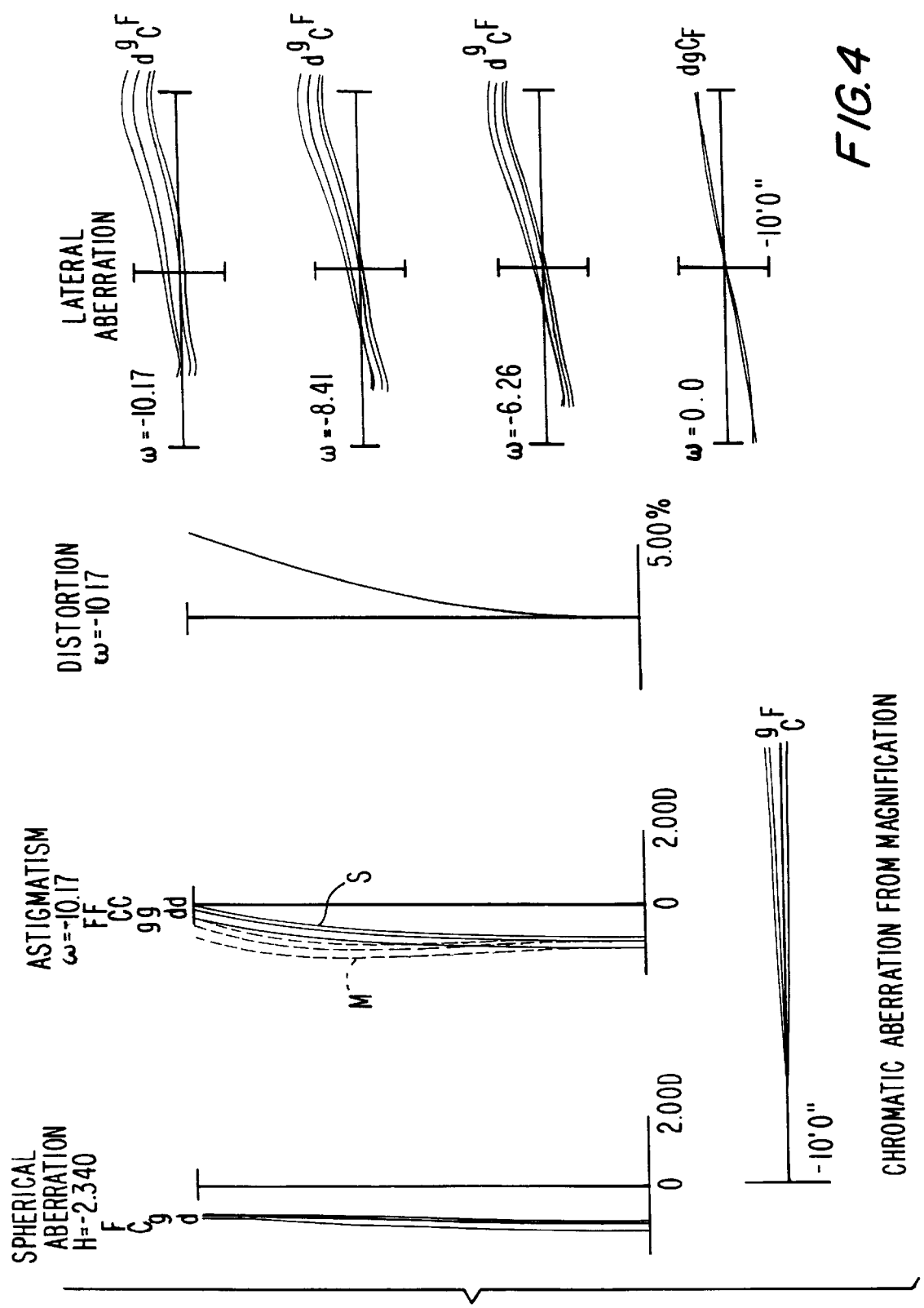
FIG. 4 is an aberration diagram of the first embodiment at maximum magnification.
Figure 6:
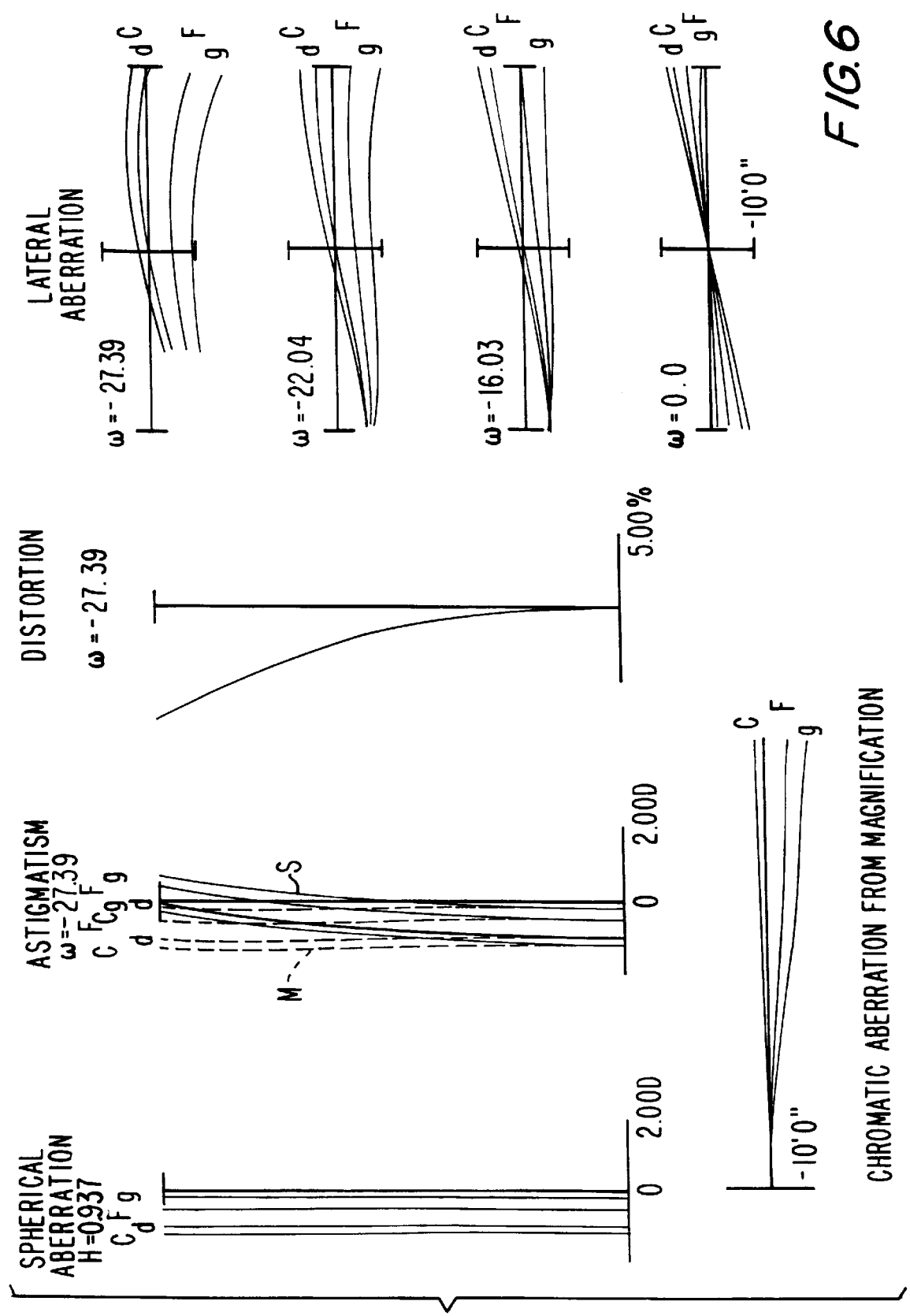
FIG. 6 is an aberration diagram of the second embodiment at minimum magnification.
Figure 7:
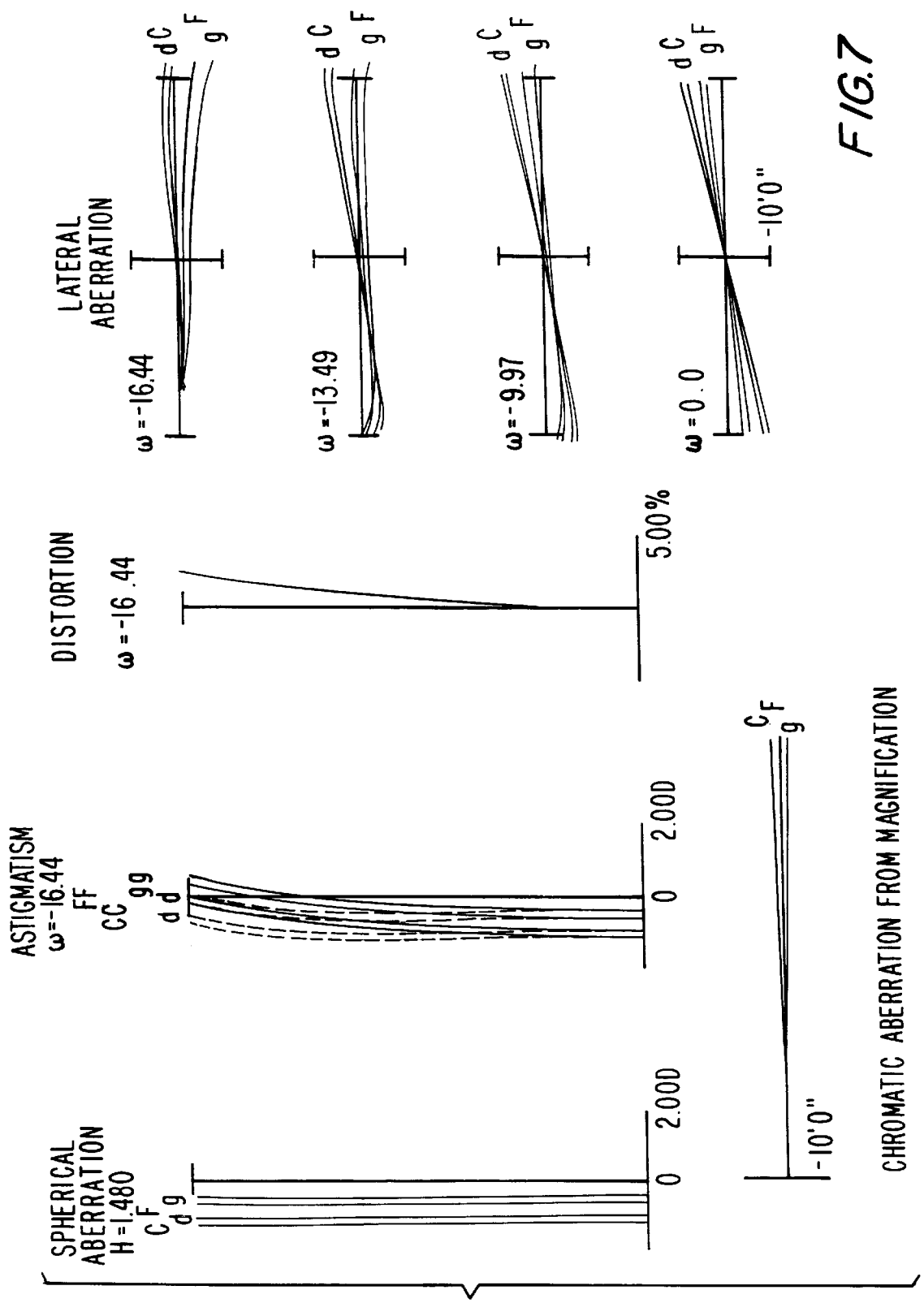
FIG. 7 is an aberration diagram of the second embodiment at intermediate magnification.
Figure 8:
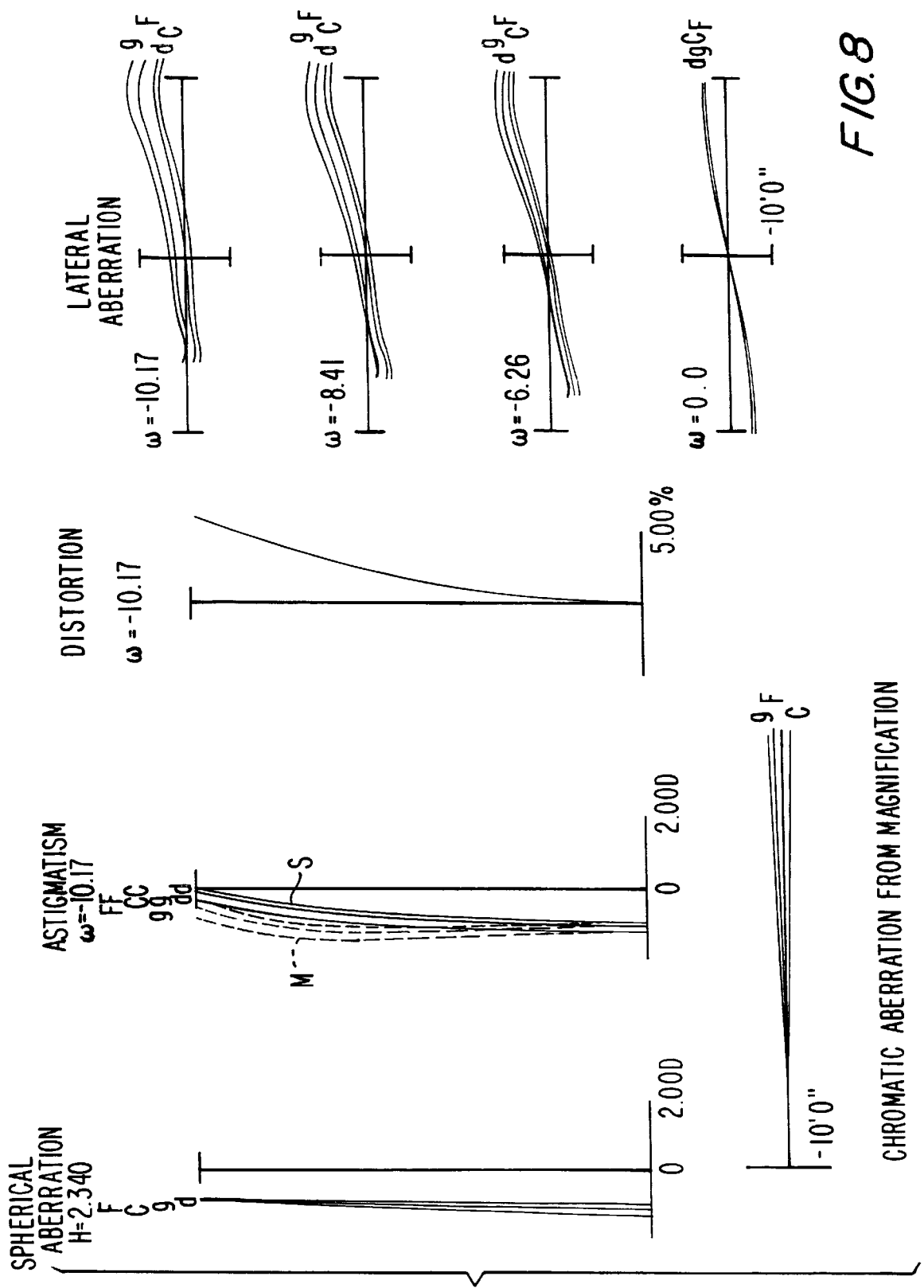
FIG. 8 is aberration diagram of the second embodiment at maximum magnification.
Figure 10:
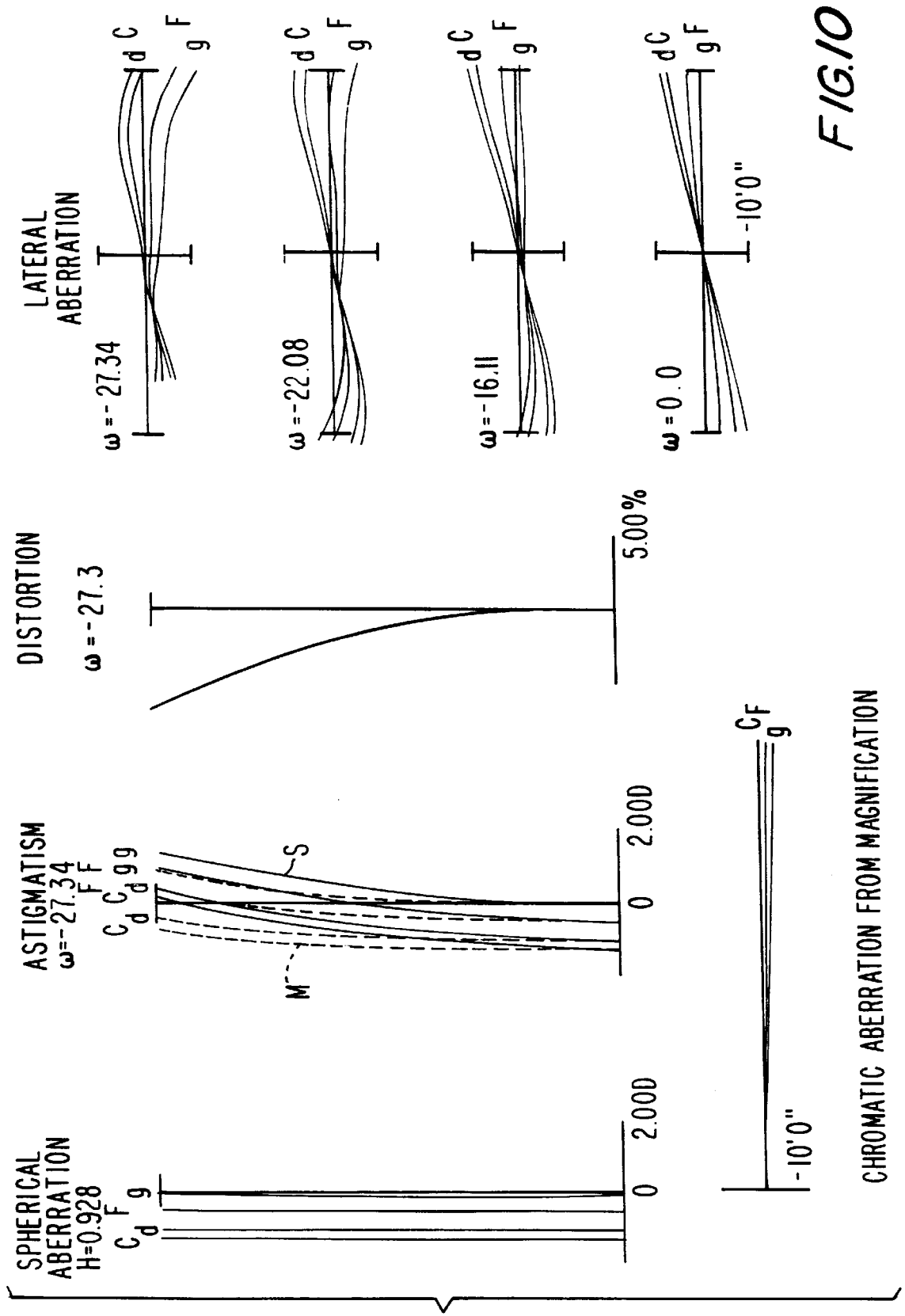
FIG. 10 is an aberration diagram of the third embodiment at minimum magnification.
Figure 11:
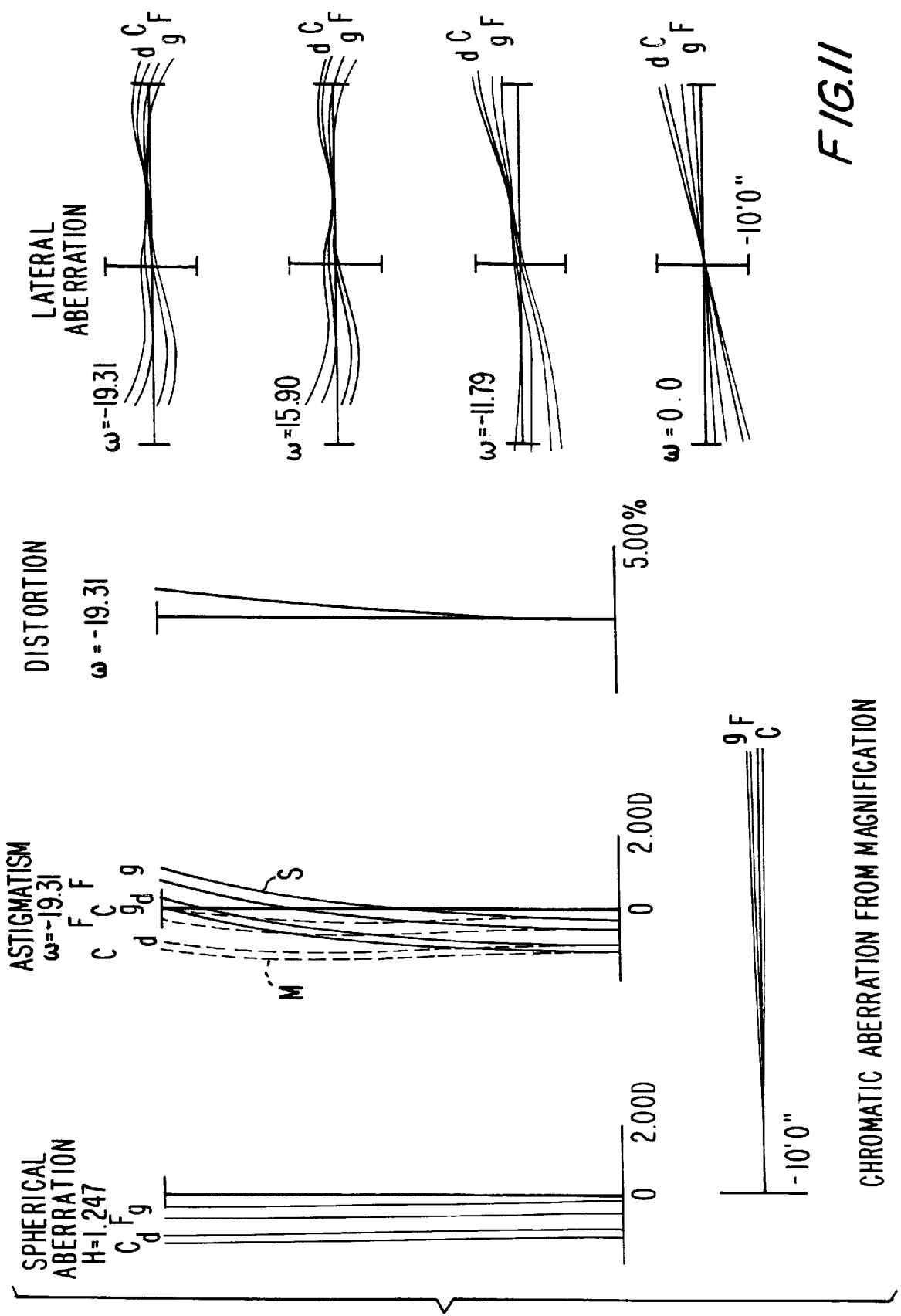
FIG. 11 is an aberration diagram of the third embodiment at intermediate magnification.
Figure 12:
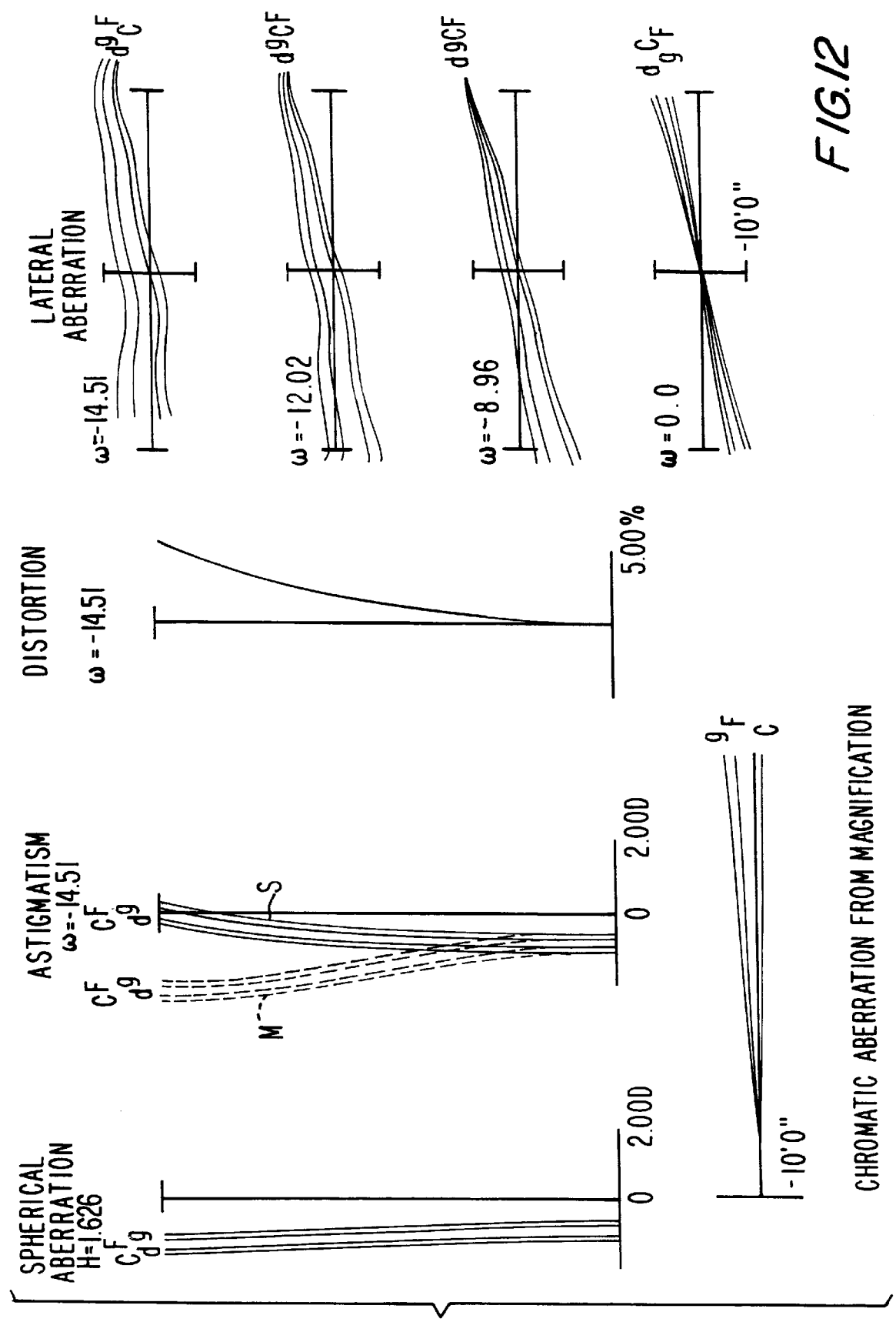
FIG. 12 is an aberration diagram of the third embodiment at maximum magnification.
Figure 14:
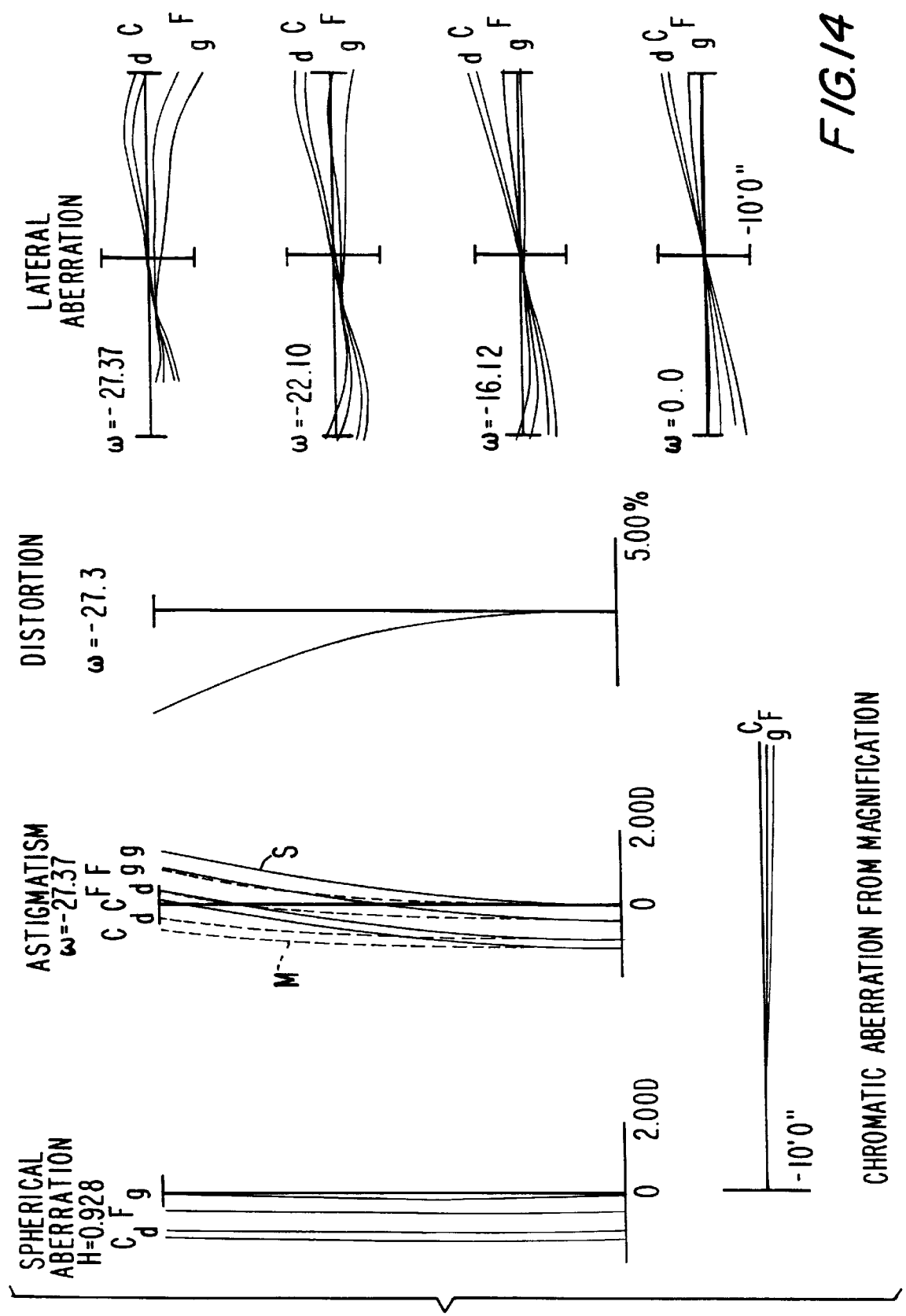
FIG. 14 is an aberration diagram of the fourth embodiment at minimum magnification.
Figure 15:
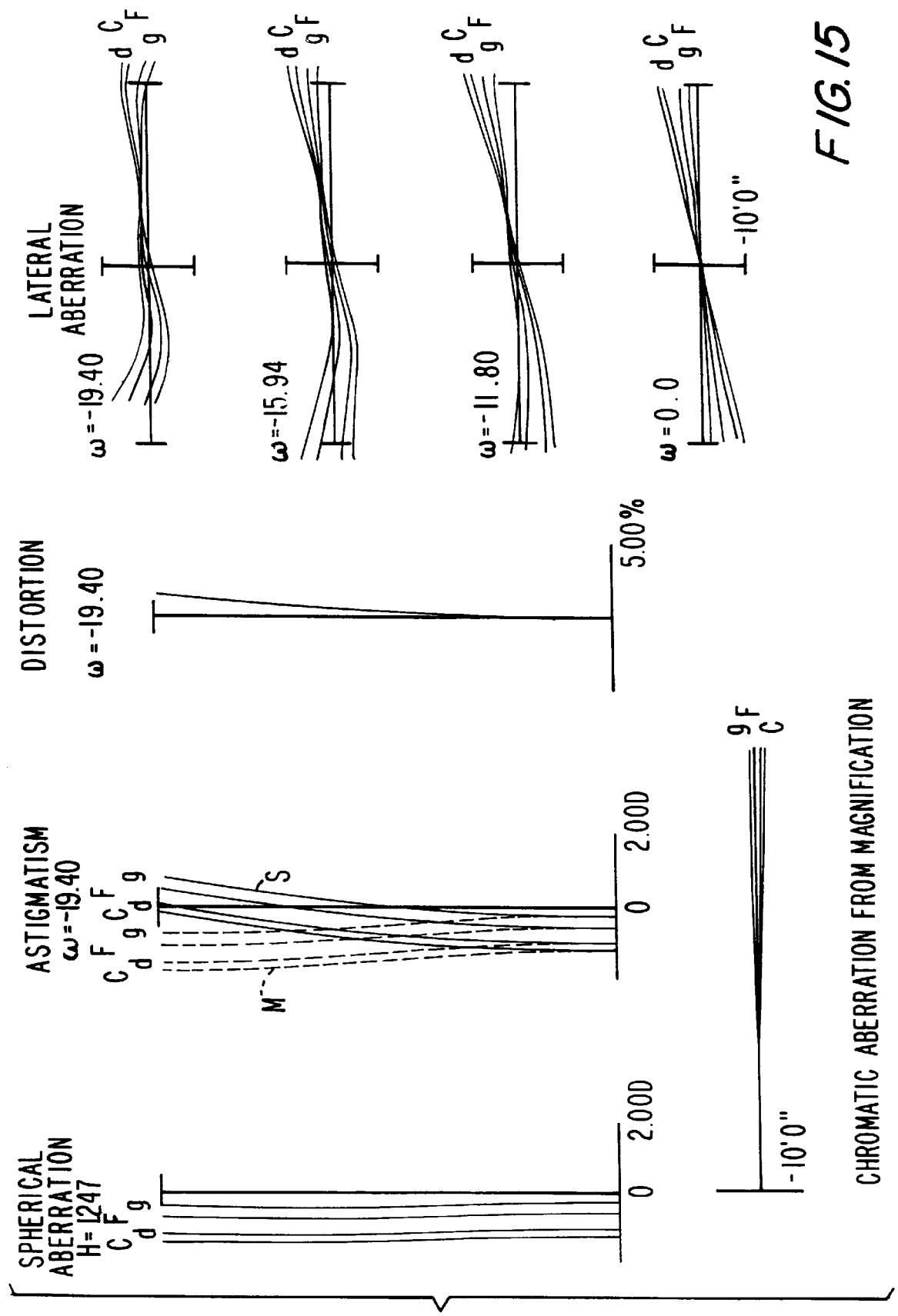
FIG. 15 is an aberration diagram of the fourth embodiment at intermediate magnification.
Figure 16:
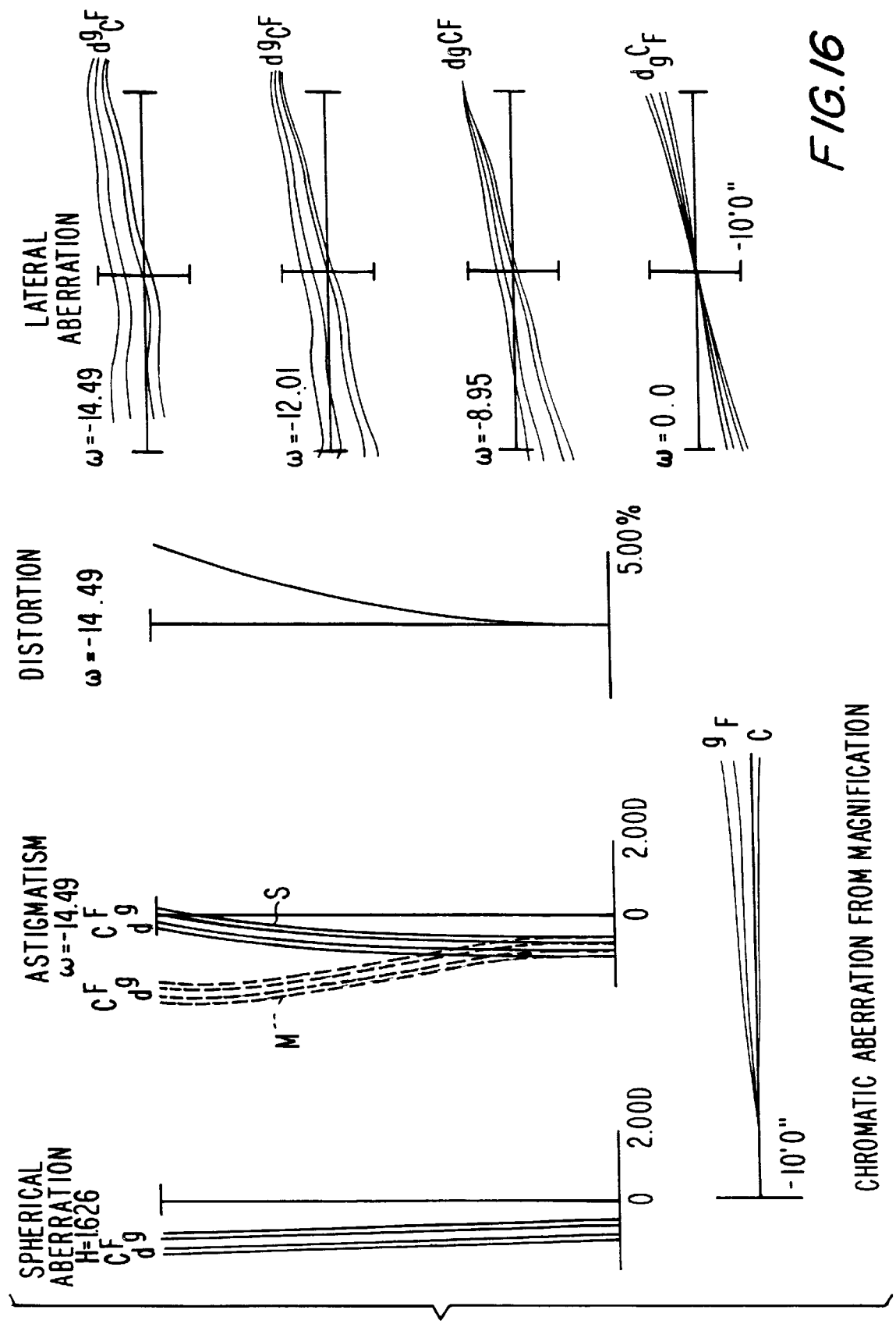
FIG. 16 is an aberration diagram of the fourth embodiment at maximum magnification.

FIGS. 2, 3, and 4 show spherical aberration, astigmatism, distortion, lateral aberration, and chromatic aberration from magnification at the minimum magnification (a), intermediate magnification (b), and maximum magnification (c), respectively, in the first embodiment. In the same manner, FIGS. 6, 7, 8, 10, 11, 12, 14, 15, and 16 show various aberrations of the second, third, and fourth embodiments. That is, FIGS. 6, 7, and 8 refer to the second embodiment; FIGS. 10, 11, and 12 refer to the third embodiment; and FIGS. 14, 15, and 16 refer to the fourth embodiment. In each of the aberration diagrams, "H" denotes the incidence height and "ω" denotes a half-field angle. Also, in the astigmatism diagram, the solid line shows the sagittal image surface and the dotted line shows the meridional image surface.

As is apparent from each of the aberration diagrams, an excellent imaging performance can be obtained by using the given lens layout and fulfilling each of the equations described in each of the embodiments.

As described above, the present invention can provide a compact high-power Keplerian finder which has a negative-positive-negative construction.

Various modifications will become possible for those skilled in the art after receiving the teachings of the present disclosure without departing from the scope thereof.

What is claimed is:

1. A finder optical system having an object side and an eye point side and having an optical axis, said system comprising:
   an object lens system including in the order named from said object side:
      a first lens group having a negative lens $L_1$;
      a second lens group having a positive lens $L_2$;
      a third lens group having a negative lens $L_3$ and an overall positive refractive power; and
   an eyepiece system for observing an image formed via said object lens system; whereby
      said positive lens $L_2$ of said second lens group in said object lens system has a bi-aspherical surface; and
      the magnification of said finder optical system is changed by moving at least said second lens group in said object lens system along said optical axis.

2. A finder optical system, as claimed in claim 1, wherein the shapes of said bi-aspherical lens surfaces of said positive lens $L_2$ fulfill the following condition:

$$0.1 < |S_2/S_1| < 0.6$$

and the shape of each of said aspherical lens surface of the positive lens $L_2$ is expressed by the following mathematical equation:

$$S(y) = \frac{y^2/R}{1 + \sqrt{1 - \kappa \cdot y^2/R^2}} + \sum_{n=2} C_n \times |y^n| - \frac{y^2/r}{1 + \sqrt{1 - y^2/r^2}}$$

$$R = 1/(1/r - 2C_2)$$

where
   y is the height perpendicular to said optical axis;
   S(y) is the deviation of the aspherical surface at said height in the optical axial direction;
   R is the reference radius of curvature;
   r is the paraxial radius of curvature;
   κ is the conical coefficient; and
   $C_n$ is the coefficient of the n-order aspherical surface; and
   wherein
      $S_1$ is the value of the S(y) of the aspherical surface of said positive lens $L_2$ which faces the object when the height $y = |0.25 \times r_3|$;
      $S_2$ is the value of the S(y) of the aspherical surface of said positive lens $L_2$ which faces the eye point defined when the height from the optical axis is y=|0.25×r$_3$|; and r$_3$ is the paraxial radius of curvature of said aspherical surface of said positive lens L$_2$ which faces the object.

3. A finder optical system, as claimed in claim 1, wherein the magnification of said finder optical system can be changed by zooming between the low-magnification end and the high-magnification end thereof, and wherein said zooming from said low end to said high end is performed by reducing the lens surface separation between said first lens group and said second lens group in said object lens system and by satisfying the following condition:

$$0.9<(D_{12W}+D_{23W})/(D_{12T}+D_{23T})<1.1)$$

wherein

D$_{12W}$ is the vertex lens surface separation between said first lens group and said second lens group at said low-magnification end;

D$_{23W}$ is the vertex lens surface separation between said second lens group and said third lens group at said low-magnification end;

D$_{12T}$ is the vertex lens surface separation between said first lens group and said second lens group at said high-magnification end;

D$_{23T}$ is the vertex separation between said second lens group and said third lens group at said high-magnification end.

4. A finder optical system, as claimed in claim 2, wherein the magnification of said finder optical system can be changed by zooming between the low-magnification end and the high-magnification end thereof, and wherein said zooming from said low end to said high end is performed by reducing the lens surface separation between said first lens group and said second lens group in said object lens system and by satisfying the following condition:

$$0.9<(D_{12W}+D_{23W})/(D_{12T}+D_{23T})<1.1$$

wherein

D$_{12W}$ is the vertex lens surface separation between said first lens group and said second lens group at said low-magnification end;

D$_{23W}$ is the vertex lens surface separation between said second lens group and said third lens group at said low-magnification end;

D$_{12T}$ is the vertex lens surface separation between said first lens group and said second lens group at said high-magnification end;

D$_{23T}$ is the vertex separation between said second lens group and said third lens group at said high-magnification end.

5. A finder optical system, as claimed in claim 1, wherein, during magnification changes, said third lens group in said object lens system is fixed and said first and said second lens groups are moved in the optical axial direction.

6. A finder optical system, as claimed in claim 2, wherein, during magnification changes, said third lens group in said object lens system is fixed and said first and said second lens groups are moved in the optical axial direction.

7. A finder optical system, as claimed in claim 3, wherein, during magnification changes, said third lens group in said object lens system is fixed and said first and said second lens groups are moved in the optical axial direction.

8. A finder optical system, as claimed in claim 1, wherein, during magnification changes, said first lens group in said object lens system is fixed and said second and said third lens groups are moved in the optical axial direction.

9. A finder optical system, as claimed in claim 2, wherein, during magnification changes, said first lens group in said object lens system is fixed and said second and said third lens groups are moved in the optical axial direction.

10. A finder optical system, as claimed in claim 3, wherein, during magnification changes, said first lens group in said object lens system is fixed and said second and said third lens groups are moved in the optical axial direction.

11. A finder optical system, as claimed in claim 1, wherein said object lens system includes a fourth lens group, which has a positive refractive power, arranged at the eye point side of said third lens group and said objective lens system fulfills the following conditions:

$$1<\beta_{34}<1.4$$

$$-0.4<(r_1+r_2)/(r_1-r_2)<0.2$$

where $\beta_{34}$ is the combined magnification of the third lens group and the fourth lens group at the low-magnification end;

r$_1$ is the radius of curvature of the surface of said negative lens which faces the object in said first lens L$_1$ group; and r$_2$ is the paraxial radius of curvature of the surface of said negative lens in said first lens L$_1$ group.

12. A finder optical system, as claimed in claim 2, wherein said object lens system includes a fourth lens group, which has a positive refractive power, arranged at the eye point side of said third lens group and said objective lens system fulfills the following conditions:

$$1<\beta_{34}<1.4$$

$$-0.4<(r_1+r_2)/(r_1-r_2)<0.2$$

where $\beta_{34}$ is the combined magnification of the third lens group and the fourth lens group at the low-magnification end;

r$_1$ is the radius of curvature of the surface of said negative lens L$_1$ which faces the object in said first lens group; and r$_2$ is the paraxial radius of curvature of the surface of said negative lens L$_1$ in said first lens group.

13. A finder optical system, as claimed in claim 3, wherein said object lens system includes a fourth lens group, which has a positive refractive power, arranged at the eye point side of said third lens group and said objective lens system fulfills the following conditions:

$$1<\beta_{34}<1.4$$

$$-0.4<(r_1+r_2)/(r_1-r_2)<0.2$$

where $\beta_{34}$ is the combined magnification of the third lens group and the fourth lens group at the low-magnification end;

r$_1$ is the radius of curvature of the surface of said negative lens L$_1$ which faces the object in said first lens group; and r$_2$ is the paraxial radius of curvature of the surface of said negative lens L$_1$ in said first lens group.

14. A finder optical system, as claimed in claim 5, wherein said object lens system includes a fourth lens group, which has a positive refractive power, arranged at the eye point side of said third lens group and said objective lens system fulfills the following conditions:

$$1<\beta_{34}<1.4$$

$$-0.4<(r_1+r_2)/(r_1-r_2)<0.2$$

where $\beta_{34}$ is the combined magnification of the third lens group and the fourth lens group at the low-magnification end;

$r_1$ is the radius of curvature of the surface of said negative lens $L_1$ which faces the object in said first lens group; and $r_2$ is the paraxial radius of curvature of the surface of said negative lens $L_1$ in said first lens group.

15. A finder optical system, as claimed in claim 1, wherein said object lens system comprises:
   a fourth lens group, which has a positive refractive power, and faces the eye point in said third lens group;
   a first reflection means in the space between said third lens group and the fourth lens group; and wherein said eyepiece lens system comprises:
      a second reflection means which reflects light from said object lens system; and
      at least one positive lens which has an aspherical surface which faces said object.

16. A finder optical system, as claimed in claim 2, wherein said object lens system comprises:
   a fourth lens group, which has a positive refractive power, and faces the eye point in said third lens group;
   a first reflection means in the space between said third lens group and the fourth lens group; and wherein said eyepiece lens system comprises:
      a second reflection means which reflects light from said object lens system; and
      at least one positive lens which has an aspherical surface which faces said object.

17. A finder optical system, as claimed in claim 3, wherein said object lens system comprises:
   a fourth lens group, which has a positive refractive power, and faces the eye point in said third lens group;
   a first reflection means in the space between said third lens group and the fourth lens group; and wherein said eyepiece lens system comprises:
      a second reflection means which reflects light from said object lens system; and
      at least one positive lens which has an aspherical surface which faces said object.

18. A finder optical system, as claimed in claim 5, wherein said object lens system comprises:
   a fourth lens group, which has a positive refractive power, and faces the eye point in said third lens group;
   a first reflection means in the space between said third lens group and the fourth lens group; and wherein said eyepiece lens system comprises:
      a second reflection means which reflects light from said object lens system; and
      at least one positive lens which has an aspherical surface which faces said object.

19. A finder optical system, as claimed in claim 8, wherein said object lens system comprises:
   a fourth lens group, which has a positive refractive power, and faces the eye point in said third lens group;
   a first reflection means in the space between said third lens group and the fourth lens group; and wherein said eyepiece lens system comprises:
      a second reflection means which reflects light from said object lens system; and
      at least one positive lens which has an aspherical surface which faces said object.

20. A finder optical system, as claimed in claim 1, wherein said eyepiece system has an eyepiece lens which has a positive refractive power and said object lens system includes an object zoom unit which basically changes the focal length thereof by moving said second lens group.

21. A finder optical system, as claimed in claim 11, wherein said eyepiece system has an eyepiece lens which has a positive refractive power and said object lens system includes an object zoom unit which basically changes the focal length thereof by moving said second lens group.

* * * * *